United States Patent [19]

Nishikawa et al.

[11] Patent Number: 4,745,826

[45] Date of Patent: * May 24, 1988

[54] SHIFT CONDITION DETECTOR FOR AN AUTOMATIC VEHICLE TRANSMISSION

[75] Inventors: Seiichi Nishikawa, Toyokawa; Yoshiharu Harada; Kagenori Fukumura, both of Toyota; Yoichi Hayakawa, Toyoake; Masao Kawai, Chirya, all of Japan

[73] Assignees: Aisin-Warner Limited, Anjo; Toyota Jidosha Kabushiki Kaisha, Toyota, both of Japan

[ * ] Notice: The portion of the term of this patent subsequent to Jul. 29, 2003 has been disclaimed.

[21] Appl. No.: 819,838

[22] Filed: Jan. 17, 1986

[30] Foreign Application Priority Data

Jan. 19, 1985 [JP] Japan .................................. 60-7772

[51] Int. Cl.$^4$ ...................... B60K 41/18; B60K 41/16
[52] U.S. Cl. ...................... 74/866; 74/867; 74/740; 180/247; 180/233
[58] Field of Search ................. 74/740, 869, 868, 867, 74/866; 180/247, 233

[56] References Cited

U.S. PATENT DOCUMENTS

| 4,369,671 | 1/1983 | Matsumoto et al. | 74/740 X |
|---|---|---|---|
| 4,388,843 | 6/1983 | Teeter | 74/477 X |
| 4,411,174 | 10/1983 | Yokoi et al. | 74/866 |
| 4,417,641 | 11/1983 | Kageyama | 180/247 |
| 4,466,502 | 8/1984 | Sakai | 180/247 |
| 4,484,654 | 11/1984 | Hayalsawa | 74/867 X |
| 4,503,927 | 3/1985 | Hayakawa et al. | 180/247 |
| 4,552,036 | 11/1985 | Takano et al. | 180/247 X |
| 4,561,325 | 12/1985 | Jester | 74/477 X |
| 4,582,159 | 4/1986 | Suzuki | 180/247 |
| 4,586,583 | 5/1986 | Yamakawa et al. | 180/247 |
| 4,592,442 | 6/1986 | Wilson et al. | 180/247 |
| 4,602,696 | 7/1986 | Taga et al. | 180/247 |
| 4,663,992 | 5/1987 | Fujiura et al. | 180/247 X |
| 4,664,217 | 5/1987 | Welch et al. | 180/247 |

Primary Examiner—Dirk Wright
Attorney, Agent, or Firm—Spencer & Frank

[57] ABSTRACT

A main transmission has a transfer gear attached to its output shaft. The transfer gear provides two wheel high speed drive, four wheel high speed drive, and four wheel low speed drive. A control system controls the main transmission according to a detected speed mode of the transfer gear. The control system uses an electrical detector for sensing the speed mode of the transfer gear.

6 Claims, 16 Drawing Sheets

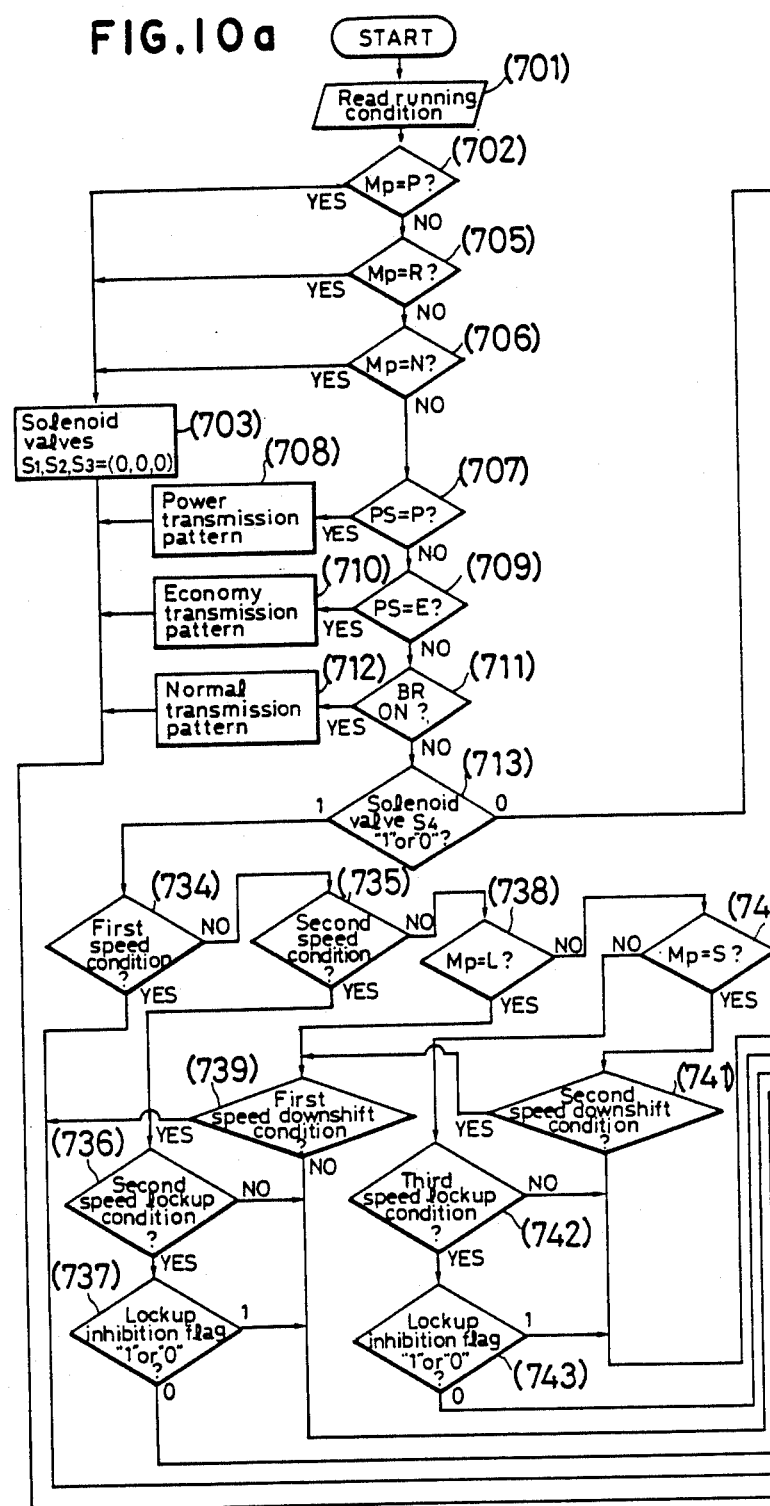

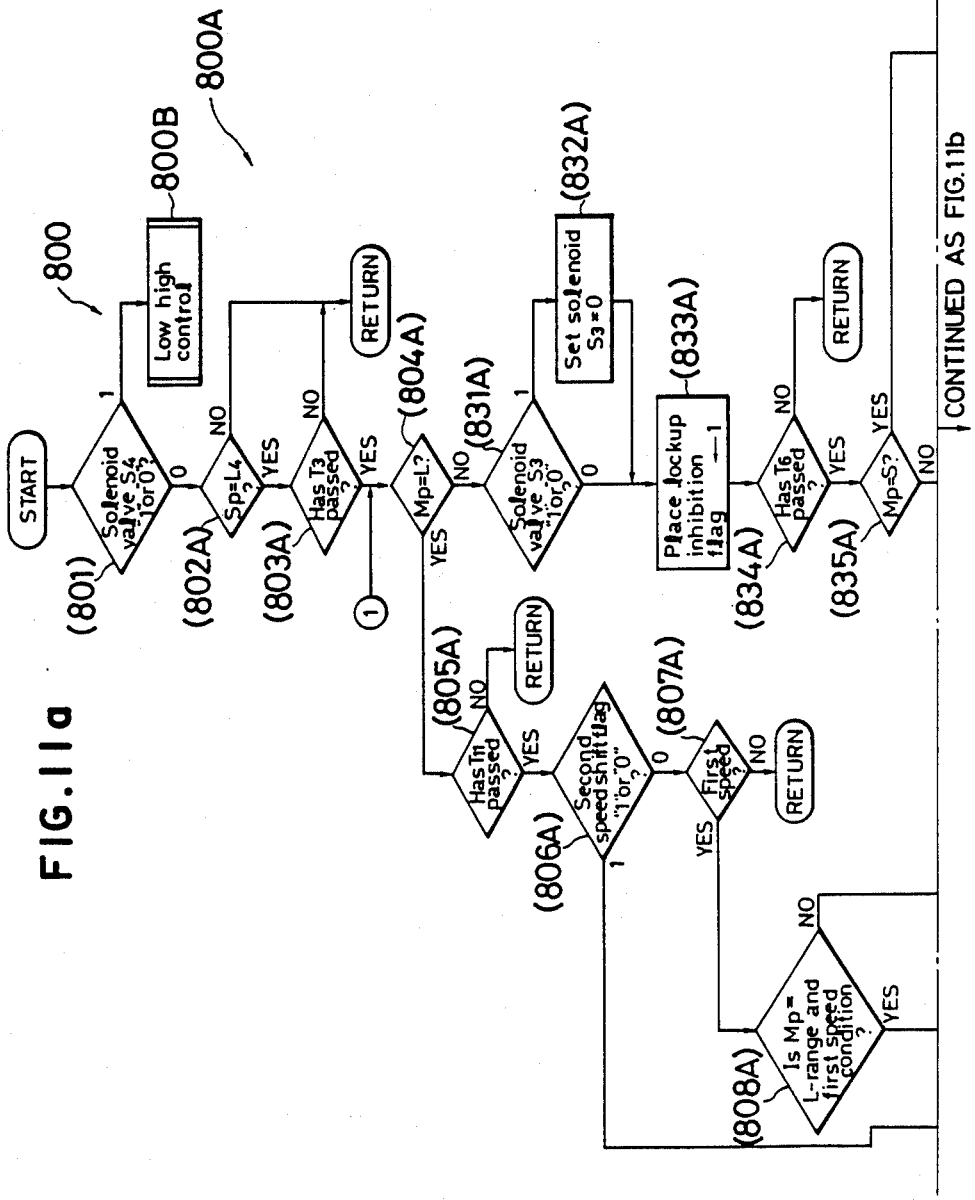

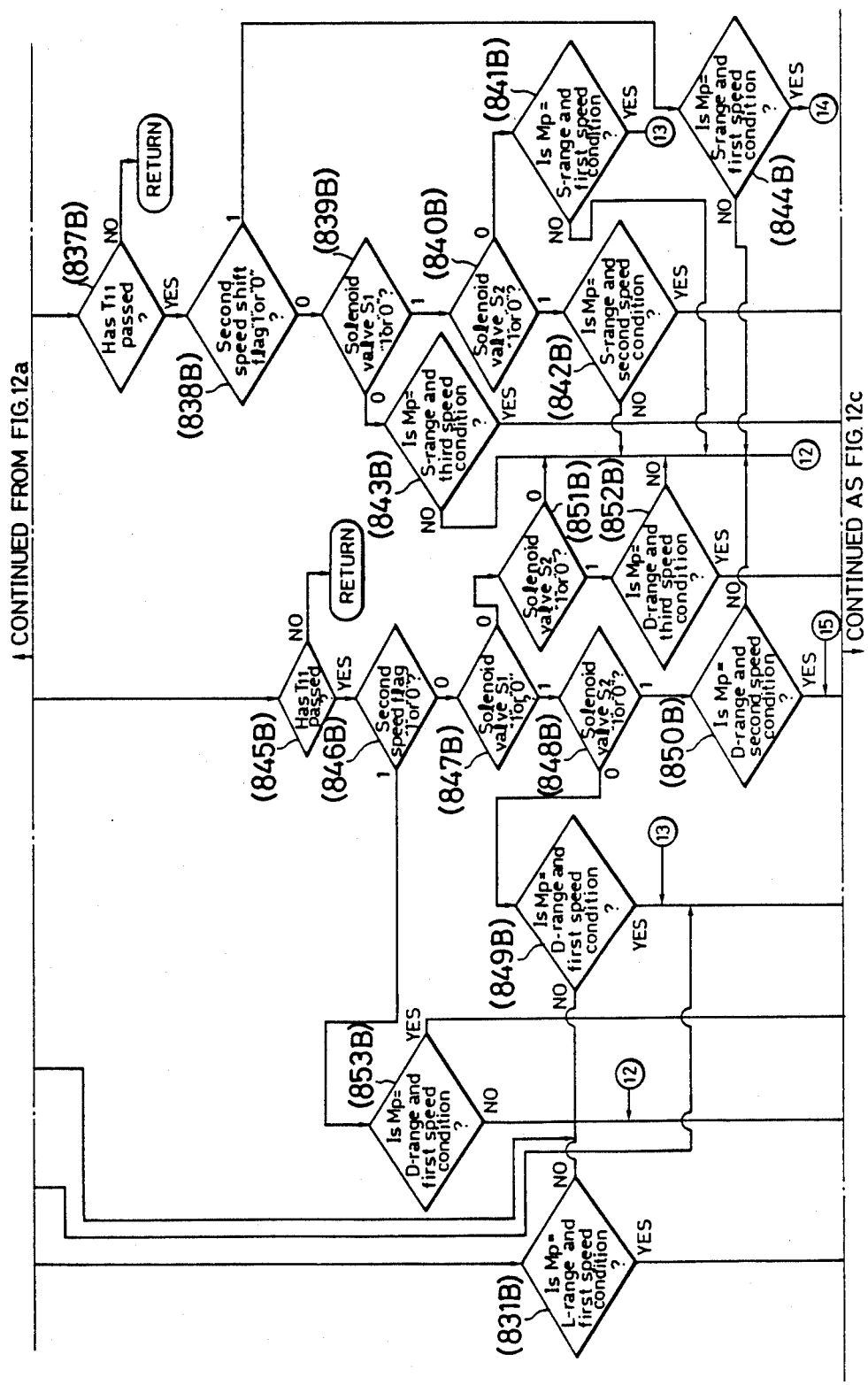

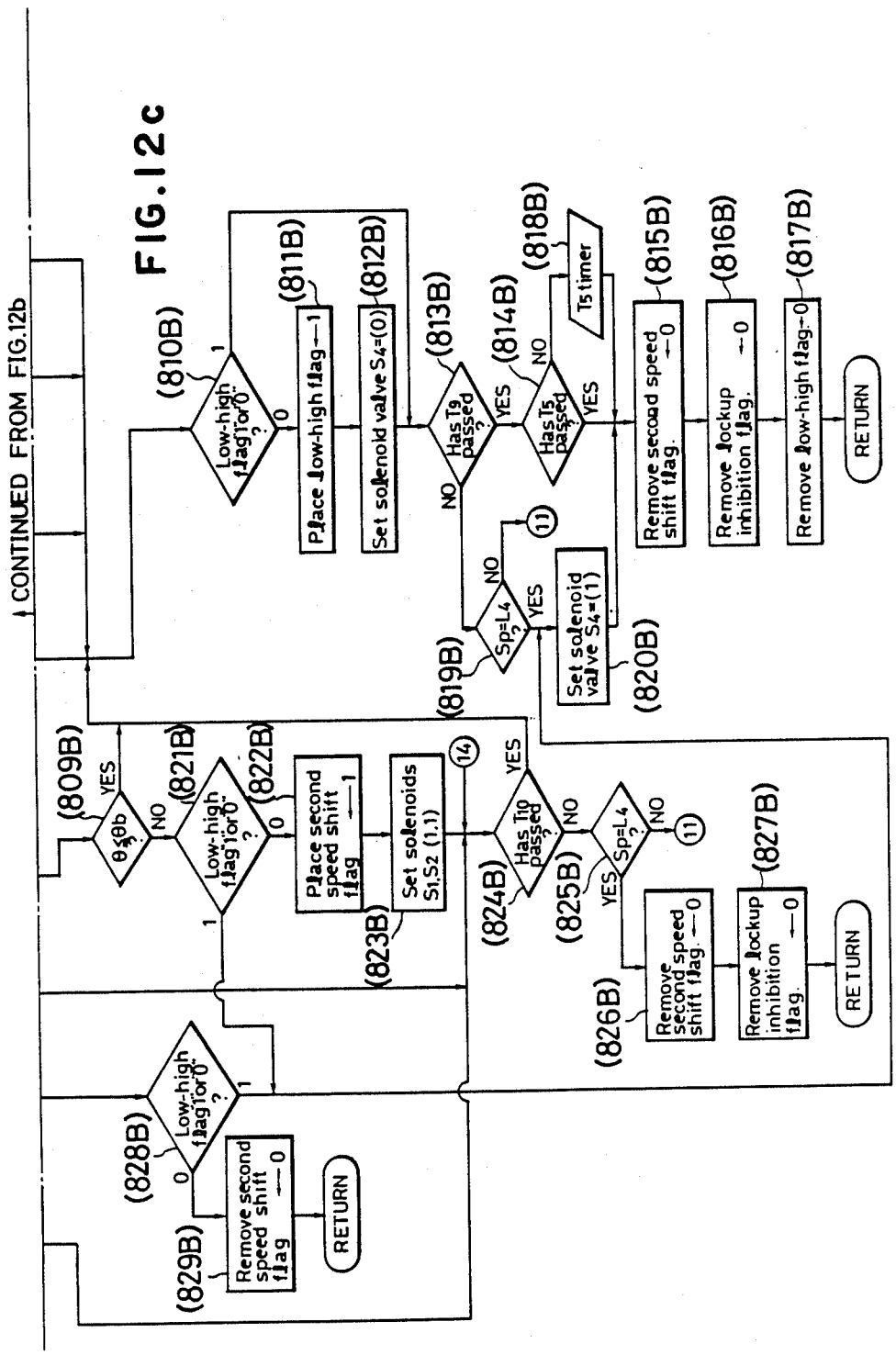

SHIFT CONDITION DETECTOR FOR AN AUTOMATIC VEHICLE TRANSMISSION

BACKGROUND OF THE INVENTION

1. Field of the Invention

The present invention relates to a transmission equipped with a transfer having a shifting mechanism and, more particularly, to a control system for controlling such a transmission.

2. Description of the Prior Art

In a conventional transmission comprising a main transmission gear which converts a constant input speed, namely, the engine speed, into output speeds, and a transfer gear capable of establishing a two-wheel drive mode or a four-wheel drive mode, or establishing a gear ratio through manual selective operation, changeover between the two-wheel drive mode and the four-wheel drive mode is achieved by a hydraulic clutch, the speed change mechanism of the transfer gear employs a planetary gearing, the sun gear of the planetary gearing is connected to the input shaft of the transfer gear, the carrier of the planetary gearing is connected to the output shaft of the transfer gear, the sun gear and the carrier are engaged or disengaged by a hydraulic clutch, the ring gear of the planetary gearing is fixed or released by a hydraulic brake, the direct drive ratio is provided by engaging engaging the hydraulic clutch and disengaging the hydraulic brake, the reduction ratio is provided by disengaging the hydraulic clutch and engaging the hydraulic brake, the hydraulic clutch and the hydraulic brake are controlled manually, and the hydraulic servomechanisms of the hydraulic clutch and the hydraulic brake are controlled by a manual shift valve which generates a hydraulic signal corresponding to the speed change ratio and a low-high changeover valve which is driven by a hydraulic pressure (governor pressure) corresponding to the running speed of the vehicle. A hydraulic pressure corresponding to the running speed is applied to one end of the low-high changeover spool of the low-high changeover valve for controlling the hydraulic servomechanisms of the hydraulic clutch and the hydraulic brake to inhibit the establishment of the reduction ratio when the shift lever is changed from the direct drive ratio position to the reduction ratio position while the vehicle is running at a high speed so that the over revolution of the engine is prevented and inappropriate speed reduction is prevented.

According to such a prior art, the oil pressure corresponding to the running speed, namely, the governor pressure, is produced by a governor valve, however, such a governor valve is able to produce only pressures corresponding to the running speeds and unable to produce a pressure correctly representing various other running conditions of the vehicle. To improve such a drawback of the conventional transmission, a method has been proposed to control the transmission according to predetermined speed change characteristics. However, means for detecting the mode of the transfer gear has not been proposed.

SUMMARY OF THE INVENTION

Accordingly, it is an object of the present invention to provide a transmission control system capable of detecting the mode of the transfer gear without delay.

The object of the present invention is achieved by a transmission control system for controlling a transmission comprising a main transmission and a transfer gear capable of being controlled by a manual shifting device, including electrical detecting means for detecting the mode of the transfer gear.

The transmission control system according to the present invention detects the mode of the transfer gear by means of the electrical detecting means, the mode of the transfer gear can be detected instantly without delay.

The above and other objects features and advantages of the present invention will become more apparent from the following description of a preferred embodiment thereof taken in conjunction with the accompanying drawings.

DESCRIPTION OF THE PREFERRED EMBODIMENT

A transmission control system, in a preferred embodiment, according to the present invention will be described hereinafter with reference to the accompanying drawings.

Figure 1:
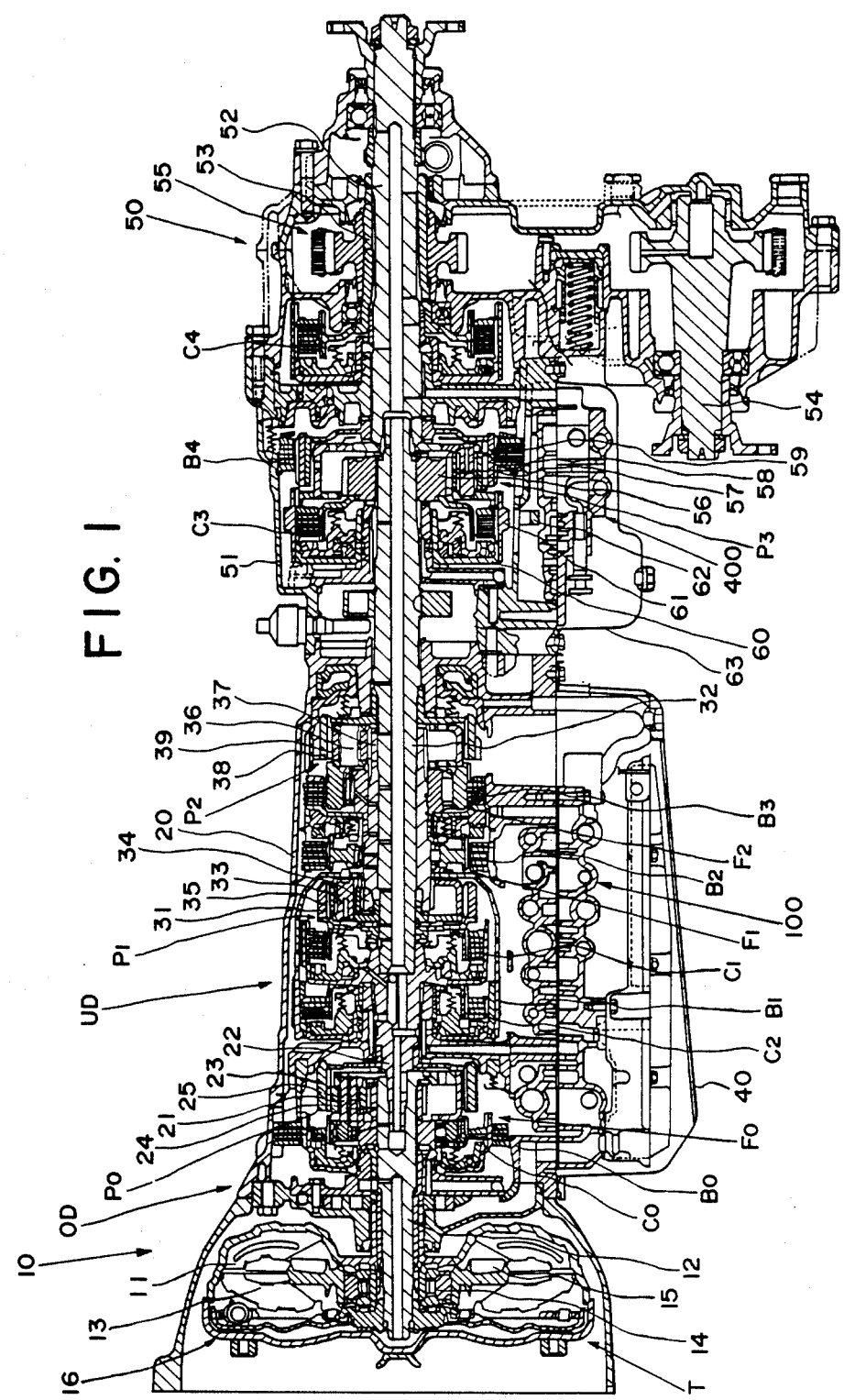
FIG. 1 is a sectional view of a four-wheel drive transmission.
Figure 2:
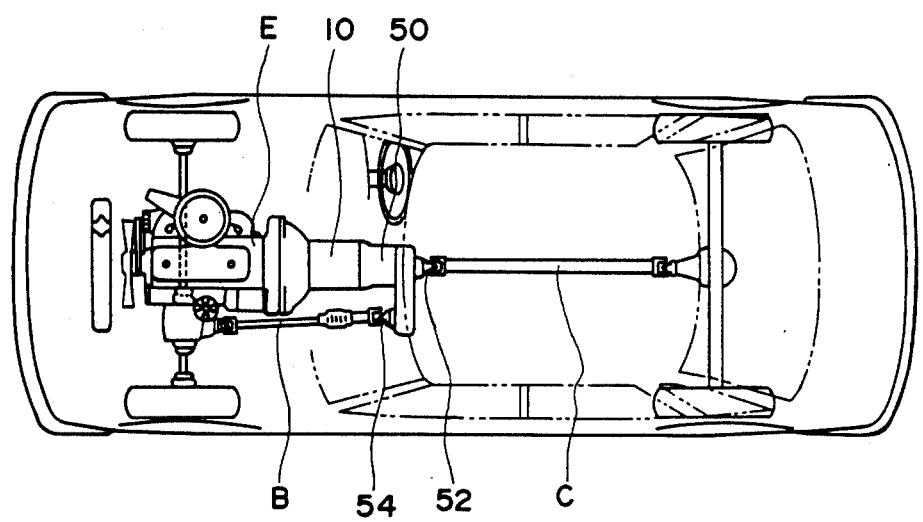
FIG. 2 is a schematic illustration of the driving system of a four-wheel drive automotive vehicle.

In FIGS. 1 and 2, indicated at 10 is a main transmission gear, namely, an automatic transmission with an overdrive, and at 50 is a transfer gear for four-wheel drive, fastened to the rear end of the planetary gearing of the main transmission gear 10. The output shaft 32 of the main transmission gear 10 joined to an engine E serves also as the input shaft of the transfer gear 50. A first output shaft 52 of the transfer gear 50 is connected to a rear propeller shaft C for driving the rear wheels, while a second output shaft 54 of the same is connected to a front propeller shaft B for driving the front wheels.

The main transmission gear 10 includes a hydraulic torque converter T, an overdrive OD, and a three-speed and reverse underdrive UD.

The hydraulic torque converter T comprises an impeller 11 connected to the output shaft of the engine E, an output shaft 12, a turbine 13 connected to the output shaft 12, a stator 15 connected through a one-way clutch 14 to a fixed member, and a direct drive clutch 16. The output shaft 12 of the hydraulic torque converter T serves also as the input shaft of the overdrive OD.

The overdrive OD comprises a multiple disc clutch C0, a multiple dis brake B0, a one-way clutch F0, and a planetary gearing P0 which is controlled through the selective engagement or disengagement of the multiple disc clutch C0, the multiple disc brake B0 and the one-way clutch F0.

The planetary gearing P0 comprises a carrier 21 connected to the output shaft 12, a ring gear 22 connected to the output shaft 22 of the overdrive OD, a sun gear 24 rotatably mounted on the output shaft 12, namely, the input shaft of the overdrive OD, capable of being fixed to the gear case 20 of the main transmission gear 10 by means of the brake B0 and connected through the clutch C0 and the one-way clutch F0 disposed in parallel to the clutch C0 to the carrier 21, and planetary pinions 25 rotatably supported on the carrier 21 and meshing with the sun gear 24 and the ring gear 23.

The output shaft 22 of the overdrive OD serves also as the input shaft of the three-speed and reverse underdrive UD.

The underdrive UD comprises multiple disc clutches C1 and C2, a belt brake B1, multiple disc brakes B2 and B3, one-way clutches F1 and F2, front platetary gearing P1, and a rear planetary gearing P2.

The front planetary gearing P1 comprises a ring gear 31 connected through the clutch C1 to the output shaft 22, a carrier 33 connected to the output shaft 32 of the underdrive UD, a sun gear 34 connected through the clutch C2 to the output shaft 22 and adapted to be fixed through the belt brake B1, the brake B2 disposed in parallel to the belt brake B1 and the one-way clutch F1 disposed in series with the brake B2 to the main transmission gear case 20, and planetary pinions 35 rotatably supported on the carrier 33 and meshing with the sun gear 34 and the ring gear 31.

The rear planetary gearing P2 comprises a carrier 36 adapted to be fixed through the brake B3 and the one-way clutch F2 disposed in parallel to the brake B3 to the main transmission gear case 20, a sun gear 37 formed integrally with the sun gear 34 of the front planetary gearing P1, a ring gear 38 connected to the output shaft 32, and planetary pinions 39 rotatably on the carrier 36 and meshing with the sun gear 37 and the ring gear 38.

The frictional coupling components, namely, the clutches and the brakes, of the main transmission gear 10 are engaged or disengaged by a hydraulic control unit 100 disposed within an oil pan 40 attached to the main transmission gear case 20 and provided with an oil strainer 101 at the bottom thereof, according to the degree of opening of the throttle of the engine E and the running conditions, such as running speed, of the vehicle, so that the main transmission gear 10 operates for four-speed automatic transmission including an overdrive speed (O/D) and reverse which is selected by manual shifting.

The transfer gear 50 is disposed so as to receive the output shaft 32 therein as the input shaft thereof and the transfer gear case 51 is fastened to the rear end of the main transmission gear case 20 with a plurality of bolts. The output shaft 32 of the underdrive UD serves as the input shaft of the clutches C3 and C4 and the brake B4. The transfer gear 50 includes a first output shaft 52 extended coaxially with the output shaft 32, a planetary gearing P3 interlocking the output shaft 32 and the first output shaft 52, a four-wheel drive sleeve 53 rotatably fitted on the first output shaft 52, a second output shaft 54 extended in parallel to the output shaft 32, and a power transmission mechanism 55 interlocking the sleeve 53 and the second output shaft 54. The planetary gearing P3 comprises a sun gear 56 splined to the rear end of the output shaft 32, planetary pinions 57 meshing with the sun gear 56, a ring gear 58 meshing with the planetary pinions 57, and a carrier 59 rotatably supporting the planetary pinions 57 and connected to the front end of the first output shaft 52 of the transfer gear 50. A parking gear 61 is formed over the outer circumference of a cylinder 60 connected to the carrier 59. When the shift lever, not shown, of the main transmission gear 10 is moved to the parking position, a detent 62 engages the parking gear 61 to lock the first output shaft 52.

The friction coupling components, namely, the clutches and the brakes, of the transfer gear 50 are controlled for engagement and disengagement by an auxiliary hydraulic control unit 400 disposed within an oil pan 63 attached to the bottom of the transfer gear case 51.

Figure 3:
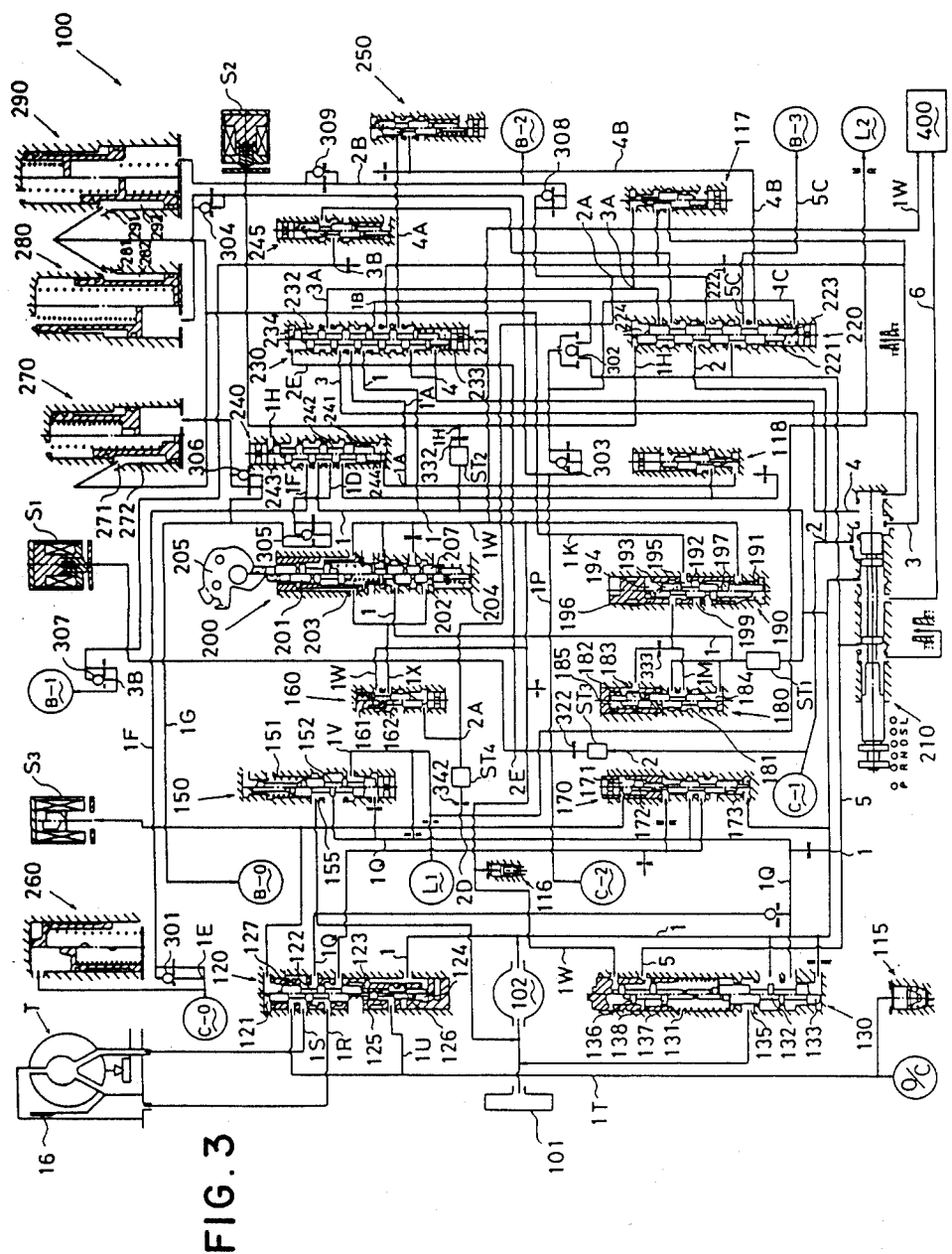
FIG. 3 is a hydraulic circuit diagram of the hydraulic control system of an automatic transmission.

FIG. 3 shows the main hydraulic control unit 100 of the main transmission gear 10.

The main hydraulic control unit 100 comprises the oil strainer 101 disposed in the oil pan 40, an oil pump 102, a cooler by-pass valve 115 for regulating the pressure in an oil cooler O/C, a pressure relief valve 116, a release clutch control valve 117, a release brake control valve 118, a lockup relay valve 120, a pressure regulating valve 130 which regulates the fluid supplied by the oil pump 102 at a line pressure and supplies the fluid at the line pressure to a line 1, a second pressure regulating valve 150 which supplies the fluid to a lubrication line L1 for the main transmission gear 10 and to a fluid supply line L2 for supplying the fluid to the transfer gear 50, a cutback valve 160, a lockup control valve 170, a first accumulator control valve 180, a second accumulator control valve 190, a throttle valve 200, a manual valve 210 for distributing the fluid of the line pressure supplied to the line 1 to lines 2 to 6, 1-2 shift valve 220, a 2-3 shift valve 230, a 3-4 shift valve 240, an intermediate coasting modulator valve 245 for regulating the pressure of the fluid supplied to the brake B1, a low coasting modulator valve 250 for regulating the pressure of the fluid supplied to a hydraulic servomechanism B-3, an accumulator 260 for smoothly engaging the clutch C0, an accumulator 270 for smoothly engaging the brake B0, an accumulator 280 for smoothly engaging the clutch C2, an accumulator 290 for smoothly engaging the Brake B2, hydraulic servomechanisms C-0, C-1, and C-2 for driving the clutches C0, C1 and C2, respectively, hydraulic servomechanisms B-0, B-1, B-2 and B-3 for driving the brakes B0, B1, B2 and B3, respectively, flow control valves with check valve 301, 303, 304, 305, 306, 307, 308 and 309 for controlling the flow rate in the corresponding lines, a shuttle valve 302, an oil strainers ST1, ST2, ST3 and ST4, a first solenoid valve S1 for controlling the 2-3 shift valve 230, a second solenoid valve S2 for controlling both the 1-2 shift valve 220 and the 3-4 shift valve 240, a third solenoid valve S3 for controlling both the lockup relay valve 120 and the lockup control valve 170, and lines interconnecting the valves and the hydraulic cylinders of the clutches and the brakes. The solenoid valves S1, S2 and S3 are controlled by an electronic control unit 600 (computer) which will be described afterward.

The fluid pumped up from the oil pan 40 through the oil strainer 101 by the oil pump 102 is supplied through the pressure regulating valve 130 at a predetermined pressure (line pressure) to the line 1.

The pressure regulating valve 130 has a spool 132, a spring 131 urging the spool 132 downward, as viewed in FIG. 3, and a plunger 138 disposed coaxially with the spool 132 and abutting against the spool 132. A throttle pressure applied through the upper line 1W to the upper land 136 of the plunger 138 and the spring force of the spring 131 work on the spool 132. When reverse, in addition to the spring force and the throttle pressure, the line pressure applied to the lower land 137 of the plunger 138 and a feedback pressure applied to the lower land 133 of the spool 132 work on the spool 132 to regulate the sectional areas of the paths by means of which the line 1 and the line 1Q communicate with a drain port 135, by shifting the spool 132 so that a line pressure corresponding to the running conditions of the vehicle is supplied to the line 1.

When the accelerator pedal is depressed, a cam 205 is turned according to the movement of the accelerator pedal. Then, a throttle plunger 201 is depressed by the cam 205 and moves a spool 202 through a spring 203 interposed between the throttle plunger 201 and the spool 202 biased by a spring 204 abutting on the lower end of the spool 202 so that the line pressure supplied through the line 1 is regulated at a throttle pressure corresponding to the degree of opening of the throttle valve and the throttle pressure is supplied to the line 1W.

The second pressure regulating valve 150 has a spool 152 biased by a spring 151 abutting on the upper end of the same, as viewed in FIG. 3. The downward spring force of the spring 151 and the upward pressure fed back through the line 1Q work on the spool 152 to shift the spool 152 accordingly so that the sizes of paths connecting the line 1Q and the lubrication line 1V to a drain port 155 are regulated to regulate the pressure of the line 1Q at a predetermined secondary line pressure (torque converter pressure). Surplus fluid is supplied to the line 1V. The fluid supplied to the line 1V is supplied through the lubrication line L1 to the main transmission gear 10 and through the line L2 to the transfer gear 50.

The manual valve 210 is controlled manually by a shift lever provided beside the driver's seat and is shifted manually to a P-postion (parking), R-position (reverse), N-position (neutral), D-position (drive range), S-position (second speed) and L-position (low speed).

When not energized, the first solenoid valve S1 supplies a high-level solenoid pressure which is equal to the line pressure to the line 2E communicating with the line 2 through an orifice 322 and, wnen energized, drains the line 2E to supply a low-level solenoid pressure.

The second solenoid valve S2, when not energized, supplies the high-level solenoid pressure to the line 1H communicating with the line 1 through the orifice 322 and, when energized, drains the line 1H to supply the low-level solenoid pressure.

The third solenoid valve S3 controls the pressure in the upper chamber 121 of the lockup relay valve 120 communicating with the line 2A through an orifice 342 and the pressure in the upper chamber 171 of the lockup control valve 170. The third solenoid valve S3, when energized, supplies the high-level solenoid pressure to the upper chambers 121 and 171 to press the spools 122 and 172 downward, as viewed in FIG. 3, and, when not energized, drains the upper chambers 121 and 171 to supply the low-level solenoid pressure so that the spools 122 and 172 are moved to the upper positions by the line pressure and the spring force of the springs 123 and 173, respectively.

The 1-2-shift valve 220 has a spool 222 biased upward by a spring 221. When the second solenoid valve S2 is not energized and the high-level solenoid pressure is supplied to the line 1H, the high-level solenoid pressure is supplied to the upper chamber 224, and hence the spool 222 is moved to the lower position, namely, a first speed position and, when the second solenoid valve S2 is energized, the line 1H is drained and the low-level solenoid pressure is supplied to the upper chamber 224 to move the spool 222 to the upper position where a speed other than the first speed is provided. In the third speed or the fourth speed, the line pressure is supplied to the lower chamber 223 through the line 1C communicating with the line 1B via the line 1 and the 2-3 shift valve 230 to fix the spool 222 at the upper position regardless of the solenoid pressure.

The 2-3 shift valve 230 has a spool 232 biased upward, as viewed in FIG. 3, by a spring 231. When the first solenoid valve S1 is energized, the low-level solenoid pressure is supplied to the line 2E, and hence the spool 232 is moved to the upper position by the spring 231 to provide the first speed, the second speed and the reverse and, when the first solenoid valve S1 is not energized, the high-level solenoid pressure is supplied to the chamber 234 through the line 2E, so that the spool 232 is moved to the lower position to provide the third speed and the fourth speed. When the line pressure is supplied to the line 4, the line pressure is supplied to the lower chamber 233, and thereby the spool 232 is fixed at the upper position regardless of the solenoid pressure.

The 3-4 shift valve 240 has a spool 242 biased upward, as viewed in FIG. 3, by a spring 241. When the second solenoid valve S2 is not energized, the high-level solenoid pressure is supplied through the line 1H to the upper chamber 243, and thereby the spool 242 is shifted to the lower position to provide the fourth speed (overdrive range) and, when the second solenoid valve S2 is energized, the line 1H is drained, and thereby the spool 242 is shifted to the upper position by the spring 241. When the line pressure is supplied through the line 1 or 3, the 2-3 shift valve 230 and the line 1A to the lower chamber 244, the spool 242 is fixed at the upper position by the agency of the line pressure and the spring 241 to provide the speeds other than the fourth speed.

The cutback valve 160 has a spool 162 biased downward by a spring 161. The line pressure is supplied through the line 2A to the lower end of the spool 162. When the line pressure is supplied to the line 2A, the spool 162 is moved to the upper position, as viewed in FIG. 3, to allow the line 1W to which the throttle pressure is supplied to communicate with the cutback pressure output line 1X to supply the throttle pressure as the cutback pressure to the line 1X to apply the cutback pressure to the bottom land 207 of the spool 202 of the throttle valve 200 so that the throttle pressure prevailing within the line 1W is reduced. When the throttle pressure is thus reduced, the spool 132 of the pressure regulating valve 130 receiving the throttle pressure is shifted to the upper position so that the line 1 is drained through the drain port 135 to reduce the line pressure, namely, to cutback the line pressure.

The first accumulator control valve 180 has a spool 181 disposed at a lower position and a plunger 183 disposed coaxially with and above the spool 181 and biased downward by a spring 182. The spool 181 is moved by the combined action of the line pressure supplied to the lower chamber 184 through the line 1, the spring force of the spring 182 and the output pressure fed back through an orifice 333 and the line 1M to the upper chamber 185 to regulate the output pressure, which is supplied through the line 1M to the second accumulator control valve 190.

The second accumulator control valve 190 has a spool 192 urged upward by a spring 191. An orifice 196 is formed in the top land 193 of the spool 192 to allow the upper chamber 194 to communicate with the intermediate chamber 195. The upward spring force of the spring 191 works on the spool 192. A throttle modulator pressure is applied through the line 1W to the bottom land 197 of the spool 192. The spool 192 is moved according to the feedback pressure supplied through the orifice 196 and the line 1M to the upper chamber 194. The output pressure of the second accumulator control valve 190 supplied to the line 1M is supplied through the line 1K and the back pressure ports 271, 281 and 291 of the accumulators 270, 280 and 290 to the back pressure chambers 272, 282 and 292 of the accumulators 270, 280 and 290, respectively, for back pressure control. The back pressure of the back pressure chambers 272, 282 and 292 is applied through the line 1K to the top land 193 of the spool 192 to move the spool 192 to the lower position so that the line 1K is able to communicate with the drain port 199 by means of the intermediate chamber 195, and thereby the line 1K is drained.

The shift lever, not shown, of the main transmission gear 10 is provided beside the driver's seat to control the manual valve 210.

The shift lever can be shifted to main speed ranges Mp, namely, the P-range (parking), R-range (reverse), N-range (neutral), D-range (drive), S-range (second speed) and L-range (low speed). The positions of the shift lever, namely, the main shift positions Mp, and the resultant operating condition of the clutches and the brakes for the fourth speed (4), the third speed (3), the second speed (2) and the first speed (1) are shown in Table 1.

Table 2 shows the relation between the range of the shift lever of the main transmission gear 10 and the connection of the lines 2, 3, 4, 5 and 6 to the line 1.

In Table 2, "O" indicates that the corresponding line is connected to the line 1, and hence the line pressure is supplied to the same, while "X" indicates that the corresponding line is drained.

TABLE 2

|  | P | R | N | D | S | L |
|---|---|---|---|---|---|---|
| Line 2 | X | X | X | O | O | O |
| Line 3 | X | X | X | X | O | O |
| Line 4 | X | X | X | X | X | O |
| Line 5 | X | O | X | X | X | X |
| Line 6 | X | O | O | O | O | O |

The manual control of the manual valve 210 and the corresponding operation of the main hydraulic control unit 100 will be described hereinafter.

(1) Shift lever position: P-range or N-range.

As shown in Table 2, none of the lines 2 to 5 is connected to the line 1 and, as shown in Table 1, the first solenoid valve S1 is energized, while the second solenoid valve S2 is not energized. Consequently, the high-level solenoid pressure is applied to the spool 222 of the 1-2 shift valve 220 to set the spool 222 at the lower position; the spool 232 of the 2-3 shift valve 230 is moved to the upper position by the spring 231; the spool 242 of the 3-4 shift valve 240 is moved to the upper position; and only the clutch C0 connected through the 3-4 shift valve 240, the line 1F, the flow control valve 301 with check valve and the line 1E, not through the manual valve 210, to the line 1 is engaged.

(2) Shift lever position: D-range.

As shown in Table 2, the line 2 is connected to the line 1 and the line pressure is supplied to the line 2, and thereby the clutch C1 is engaged.

At the start of the vehicle where the first speed is provided, as shown in Table 2, the first solenoid valve S1 is energized, the second solenoid valve S2 is not energized, the spool 222 of the 1-2 shift valve 220 is set at the lower position, the lines 3B and 2A connected to the brakes B1 and B2 are drained, the line pressure is not supplied to the line 5C connected to the brake B3, hence the brakes B1, B2 and B3 are disengaged, the spool 232

TABLE 1

| Mp | | S1 | S2 | S3 | C1 | C2 | C0 | B1 | B2 | B3 | B0 | F1 | F2 | F3 |
|---|---|---|---|---|---|---|---|---|---|---|---|---|---|---|
| P | | O | X | X | X | X | E | X | X | X | X | f | f | f |
| R | | O | X | X | X | E | E | X | X | E | X | f | f | f |
| N | | O | X | X | X | X | E | X | X | X | X | f | f | f |
| D | 1 | O | X | X | E | X | E | X | X | X | X | f | L | (L) |
|  | 2 | O | O | X | E | X | E | X | E | X | X | L | f | (L) |
|  | 3 | X | O | Δ | E | E | E | X | E | X | X | f | f | (L) |
|  | 4 | X | X | Δ | E | E | X | X | E | X | E | f | f | f |
| S | 1 | O | X | X | E | X | E | X | X | X | X | f | L | (L) |
|  | 2 | O | O | X | E | X | E | E | E | X | X | (L) | f | (L) |
|  | 3 | X | O | Δ | E | E | E | X | E | X | X | f | f | (L) |
|  | (3) | X | X | X | E | E | E | X | E | X | X | f | f | (L) |
| L | 1 | O | X | X | E | X | E | X | X | E | X | f | (L) | (L) |
|  | 2 | O | O | X | E | X | E | E | E | X | X | (L) | f | (L) |
|  | (1) | X | X | X | E | X | E | X | E | X | X | f | (L) | (L) |

Note:
In the columns for S1 and S2, "O" indicates energized state and "X" indicates de-energized state.
In the column for S3, "Δ" indicates that the solenoid S3 is energized to produce the high-level solenoid pressure and "X" indicates that the solenoid valve S3 is de-energized to produce the low-level solenoid pressure.
In the columns for onw-way clutches, "L" indicates that the corresponding one-way clutch is engaged during an engine-driving mode while the driving power is transmitted through the clutch or the brake disposed in parallel to the one-way clutch, and hence the function of the one-way clutch is not necessarily essential (lock), "(L)" indicates that the corresponding one-way clutch is engaged in an engine-driving mode and is disengaged in an engine-braking mode, and "f" indicates that the corresponding one-way clutch is free.

of the 2-3 shift valve 230 is moved to the upper position to drain the line 1B, the clutch CO is disengaged, the line pressure is supplied through the line 1A to the bottom chamber 244 of the 3-4 shift value 240 to move the spool 242 to the upper position, the line 1 is connected through the 3-4 shift valve 240 and the line 1F to the clutch CO to engage the clutch CO, the line 1B is drained to disengage the clutch C2, and the line pressure is supplied to the line 1F to drain the line 1D and to disengage the brake BO, and thereby the first speed is provided. When the running speed increased to a predetermined running speed, the electronic control unit 600 provides a signal to energize the second solenoid S2 so that the pressure in the top chamber 224 of the 1-2 shift valve 220 is changed to the low-level solenoid pressure. Consequently, the spool 222 of the 1-2 shift valve is move to the upper position, the line pressure is supplied through the line 2, the 1-2 shift valve 220, the line 2A, the flow control valve 308 with check valve and the line 2B to the brake B2 to engage the brake B2, and thereby the transmission is caused to upshift to the second speed.

When the transmission is required to upshift to the third speed, the electronic control unit 600 gives a signal to de-energize the first solenoid valve S1. Consequently, the spool 232 of the 2-3 shift valve 230 is moved to the lower position, the line pressure is supplied to the servomechanism of the clutch C2 through the line 1, the 2-3 shift valve 230, the line 1B, the shuttle valve 302, the flow control valve 303 with check valve and the line 1P to engage the clutch C2, and the spool 222 of the 1-2 shift valve 220 is fixed at the upper position (position for speeds other than the first speed) by the line pressure supplied through the line 1C to the bottom chamber 223.

When the transmission is required to upshift to the fourth speed, the electronic control unit 600 gives a signal to de-energize the second solenoid valve S2. Consequently, the solenoid pressure supplied to the top chamber 243 of the 3-4 shift valve 240 through the line 1H is reduced to the low level solenoid pressure, the spool 242 of the 3-4 shift valve 240 is moved to the lower position, the line 1F is drained, the line pressure is supplied to the line 1D, the line pressure is supplied through the flow control valve 305 with check valve to the line 1G, and thereby the clutch CO is disengaged and the brake BO is engaged.

(3) Shift lever position: S-range.

As shown in Table 2, the line pressure is supplied to both the lines 2 and 3. The manner of upshift from the first speed through the second speed to the third speed is the smae as that of upshift when the shift lever is positioned in the D-range. However, since the line pressure is supplied through the line 1 or 3, the 2-3 shift valve 230 and the line 1A to the bottom chamber of the 3-4 shift valve 240 to move the spool 242 to the upper position, upshift to the fourth speed is inhibited. In the second speed, similarly to the second speed with the shift lever positioned in the D-range, the line pressure is supplied to the servomechanisms of the clutches C0 and C1 and the brake B2 and to the intermediate coasting modulator valve 245 through the line 3, the 2-3 shift valve 230, the line 3A, the 1-2 shift valve 220 and the line 3D. Consequently, a pressure regulated by the intermediate coasting modulator valve 245 is supplied to the line 3B to engage the brake B1 to provide the second speed, where both the brakes B1 and B2 are always engaged. In the second speed with the shift lever shifted to the S-range, engine brake is effective during coasting and the transmission torque capacity is increased.

When the shift lever is shifted from the D-range to the S-range while the vehicle is running at the fourth speed with the shift lever positioned in the D-range, the line pressure is supplied to the bottom chamber 244 of the 3-4 shift valve 240, and thereby downshift from the fourth speed to the third speed is achieved immediately.

(4) Shift lever position: L-range

As shown in Table 2, the line pressure is supplied to the lines 2, 3 and 4. The manner of upshift from the first speed to the second speed is the same as that of upshift when the shift lever is positioned in the D-range, However, since the line pressure is supplied through the line 4 to the bottom chamber 233 of the 2-3 shift valve 230 to fix the spool 232 at the upper position, upshift to the third speed is inhibited. When the first speed is provided, the fluid is supplied to the servomechanism of the brake B3 through the line 4, the 2-3 shift valve 230, the line 4A, the low coasting modulator valve 250, the line 4B, the 1-2 shift valve 220 and the line 5C to engage the brake B3, and hence engine brake is effective. When the second speed is provided, the condition is the same as that when the shift lever is shifted to the S-range. When the shift lever is shifted to the L-range while the vehicle is running at the third speed, the line pressure is introduced into the bottom chamber 233 of the 2-3 shift valve 230, and thereby downshift to the second speed is achieved immediately. After the running speed has been reduced to an expected running speed, the electronic control unit 600 provides a signal to energize the second solenoid valve S2 to downshift from the second speed to the first speed.

(5) Shift lever position: R-range.

As shown in Table 2, the lines 2, 3 and 4 are drained and the line pressure is supplied to the line 5. Since the line pressure is not supplied to the lines 2 and 3 connected to the servomechanisms of the clutch C1 and the brakes B1 and B2, the clutch C1 and the brakes B1 and B2 are disengaged. The line pressure is supplied to the servomechanism of the clutch C2 through the line 5, the shuttle valve 302, the flow control valve 303 with check valve and the line 1P to engage the clutch C2. Since the line pressure is supplied to the bottom chamber 223 of the 1-2 shift valve 220 through the line 1C, the spool 222 is moved to the upper position, and hence the line pressure is supplied to the line 5C, so that the brake B3 is engaged. Since the first solenoid valve S1 is energized, the low-level solenoid pressure prevails in the top chamber 243 of the 2-3 shift valve 240, and hence the spool 232 is moved to the upper position. The line pressure is supplied through the line 1, the 2-3 shift valve 230 and the line 1A to the bottom chamber 244 of the 3-4 shift valve 240 to move the spool 242 to the upper position, and thereby the line pressure is supplied through the line 1, the 3-4 shift valve 240 and the line 1F to the servomechanism of the clutch C0 to engage the clutch C0. Since the line 1D associated with the brake B0 is drained, the brake B0 is disengaged and the reverse is provided.

When the shift lever is positioned in the D-range or the S-range, the line pressure is supplied to the line 2, and the spool 222 of the 1-2 shift valve 220 is moved to the upper position (position for speeds other than the first speed), the line pressure is supplied to the top chamber 121 of the lockup relay valve 120 through the lines 1A and 2D. In this state, when the third solenoid valve S3 is energized and the high-level solenoid pressure is applied to the top chamber 121, the spool 122 of the lockup relay valve 120 is moved to the lower position to connect the lines 1Q and 6B. Consequently, the direct coupling clutch 16 of the torque converter T is engaged to establish the direct coupling state of the torque converter T. When the line pressure is not supplied to the line 2A or when the line pressure is supplied to the line 2A and the third solenoid valve S3 is not energized to supply the low-level solenoid pressure to the top chamber 121 of the lockup relay valve 120, the spool 122 is moved to the upper position by the line pressure supplied to the bottom chamber 124 through the line 1. While the spool 122 is positioned at the upper position, the line 1Q communicates with the line 1R, and hence the direct coupling clutch 16 of the torque converter T is disengaged. The secondary line pressure (torque converter pressure) supplied from the torque converter T to the line 1S while the spool 122 is positioned at the upper position, namely, in a state other than the lockup state, is supplied through the lockup relay valve 120 and the line 1T to the oil cooler O/C and through the line 1, the orifice 126 formed in the sleeve 125 of the lockup relay valve 120 and line 1U and 1T to the oil cooler O/C.

Figure 4:
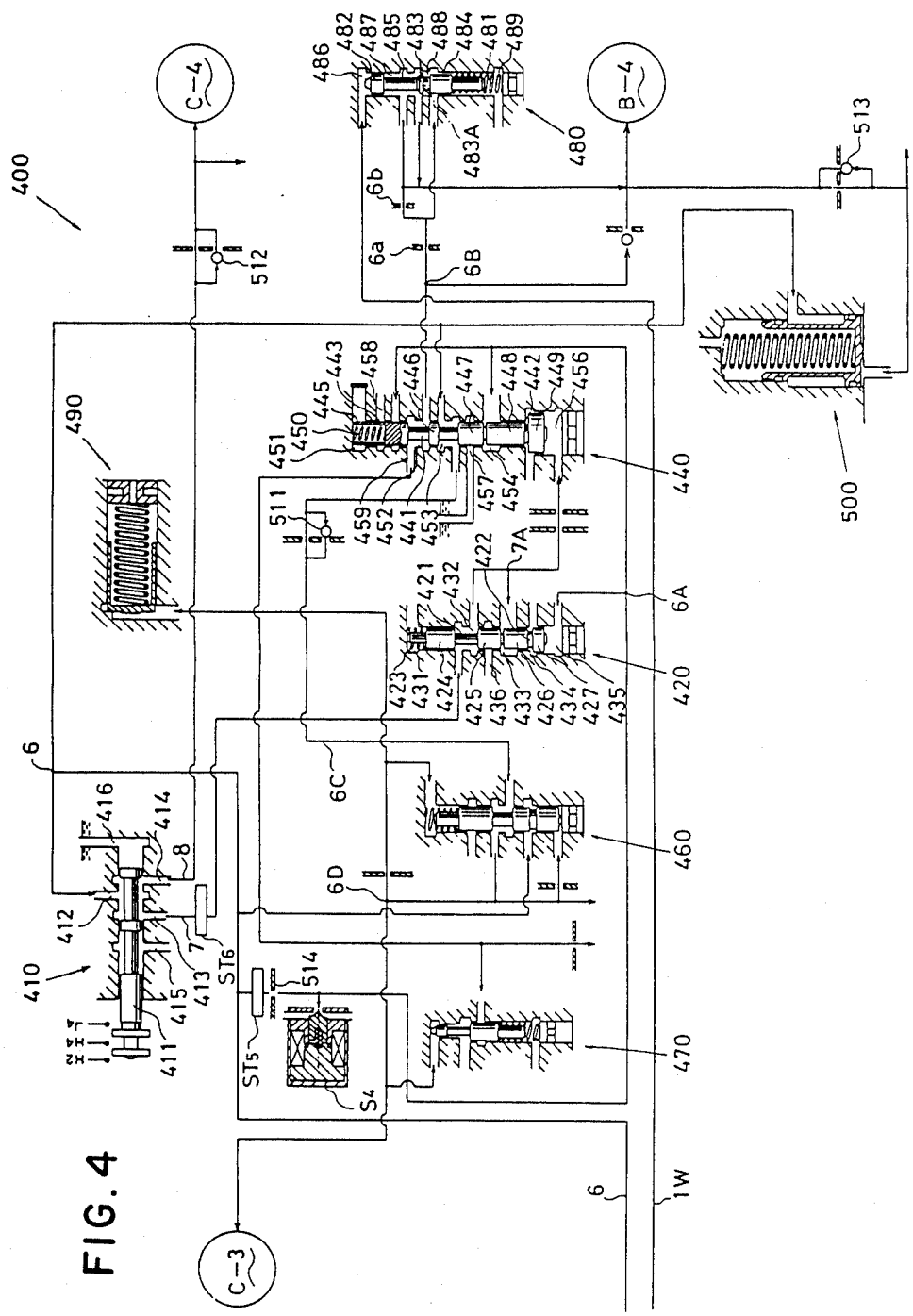
FIG. 4 is a hydraulic circuit diagram of the hydraulic control system of a transfer gear.

FIG. 4 shows the auxiliary hydraulic control unit 400 of the transfer gear 50.

The auxiliary hydraulic control unit 400 comprises a transfer manual valve 410 for supplying the fluid supplied thereto through the line 6 of the main hydraulic control unit 100 of the main transmission gear 10 to the lines 7 and 8 when operated by a shift lever provided beside the driver's seat, a relay valve 420, an inhibitor valve 440 for controlling the clutch C3 and the brake B4, a third accumulator control valve 460, a shift timing control valve 470, an orifice control valve 480 for smoothly engaging the brake B4, an accumulator 490 for smoothly engaging the clutch C3, an accumulator 500 for smoothly engaging the brake B4, the respective hydraulic servomechanisms C-3, C-4 and B-4 of the clutches C3 and C4 and the brake B4, flow control valves 511, 512 and 513 with check valve for controlling the flow rate of the fluid, oil strainers ST5 and ST6, a fourth solenoid valve S4 which is controlled by the electronic control unit 600, which will be described afterward, and lines interconnecting the valves and the hydraulic cylinders of the clutches and brake.

Figure 5:
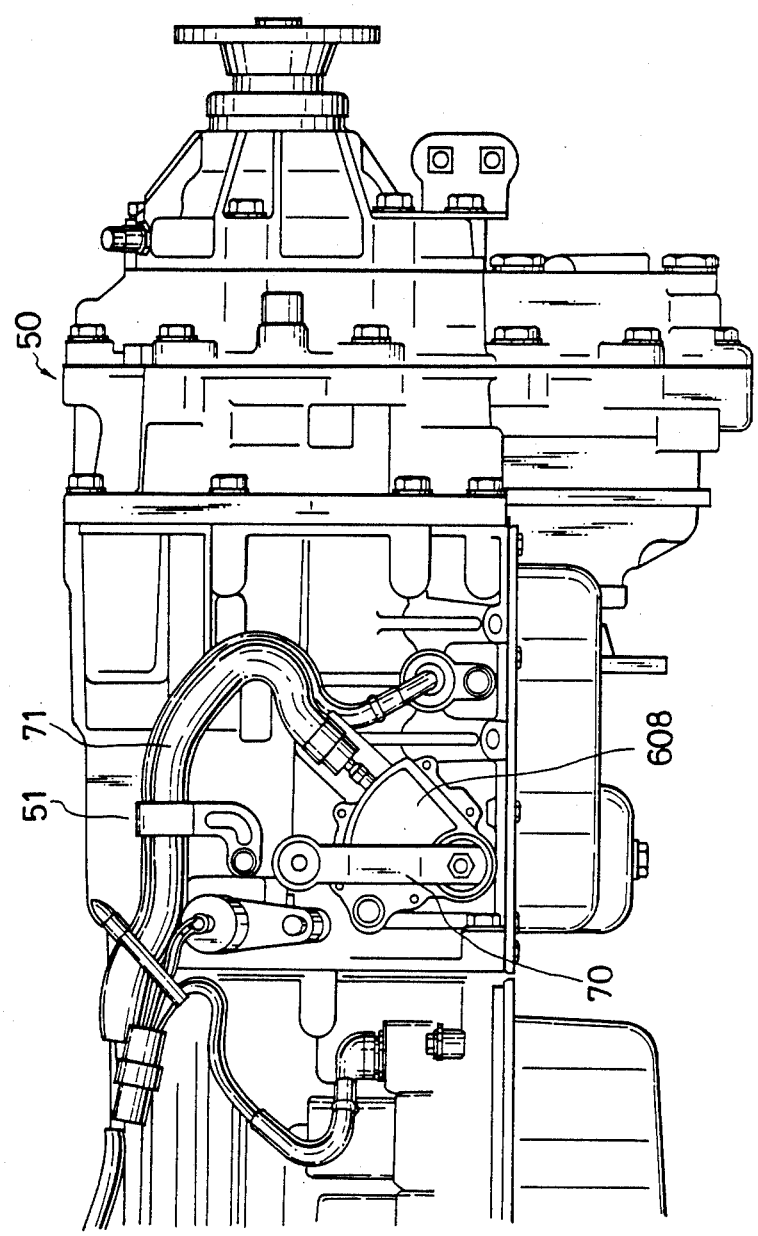
FIG. 5 is a fragmentary side elevation of a four-wheel drive transmission, showing a transfer gear shift lever position sensor of the present invention.
Figure 7:
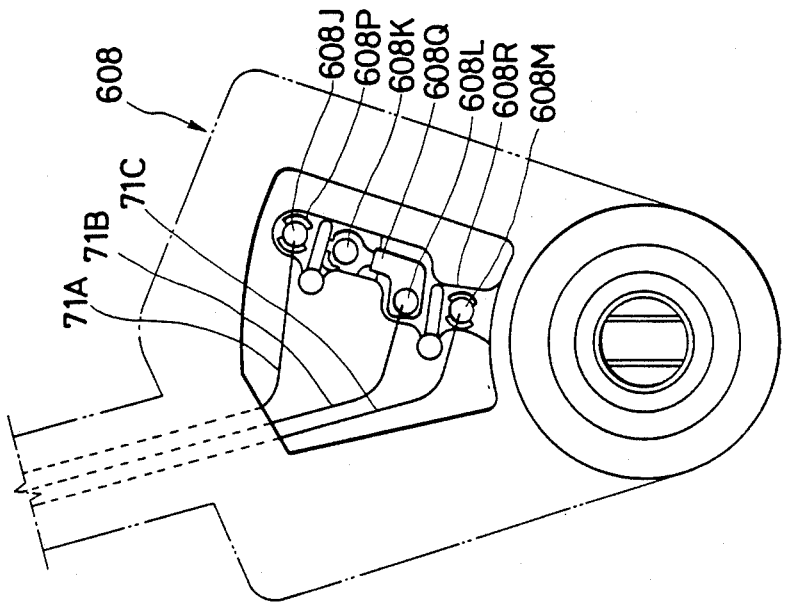
FIG. 7 is a fragmentary side elevation of the shift lever position sensor.
Figure 6:
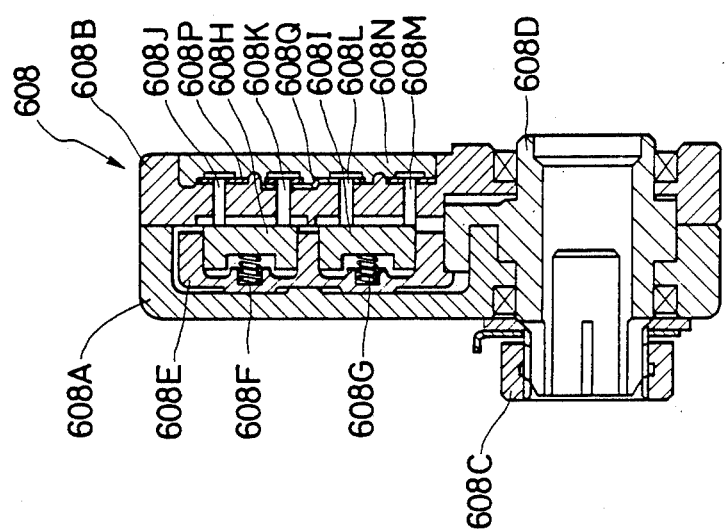
FIG. 6 is a sectional view of the shift lever position sensor.
Figure 8:
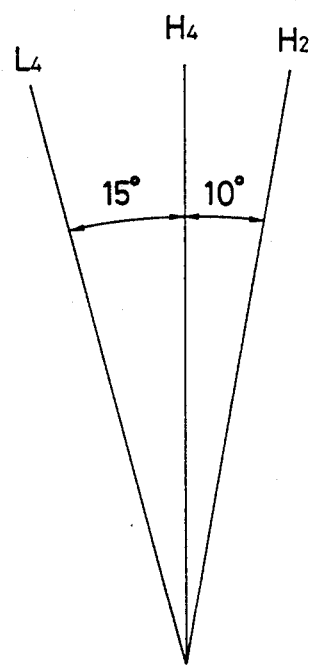
FIG. 8 is a diagram of assistance in explaining the relation between the position of a manual valve driving lever and the corresponding speed range.

Referring to FIG. 5, the spool 411 of the transfer manual valve 410 is driven by a manual valve driving lever 70 connected by a wire or a rod to a shift lever provided beside the driver's seat for selectively controlling the transfer manual valve 410 to provide a two-wheel drive mode or a four-wheel drive mode. In this embodiment, as shown in FIG. 8, the manual valve driving lever 70 is shifted between an upright position (the position illustrated in FIG. 5) for H4-range (high-speed four-wheel drive), an inclined position deviating clockwise by about an angle of 10° from the upright position for H2-range (high-speed two-wheel drive) and an inclined position deviating counter-clockwise by about an angle of 15° from the upright position for L4-range (low-speed four-wheel drive). A transfer shift lever position sensor 608 having mechanical switches for detecting the position of the manual valve driving lever 70 is interposed between the manual valve driving lever 70 and the transfer gear case 51 and is fixed to the transfer gear case 51 with a plurality of bolts. The transfer shift lever position sensor 608 is connected to the electronic control unit 600 by a cable. As illustrated in FIGS. 6 and 7, the transfer shift lever sensor 608 comprises cases 608A and 608B fastened to the transfer gear case 51 with bolts, a nonconductive rotor 608E slidably disposed within the cases 608A and 608B and fixed to the manual valve driving lever 70 with a nut 608C, conductive contacts 608H and 608I loosely fitted in the rotor 608E and urged by springs 608F and 608G toward the transfer gear case 51, respectively, terminals 608J and 608K corresponding to the contact 608H, terminals 608L and 608M corresponding to the contact 608I, and a terminal cover 608N attached to the case 608B on the side of the transfer gear case 51 to fix the terminals 608J, 608K, 608L and 608M. The terminal 608J is connected through a washer 608P to a lead wire 71A; the terminals 608K and 608L are interconnected by a washer 608Q and are connected to a lead wire 71B (earth wire); and the terminal 608M is connected through a washer 608R to a lead wire 71C. When the manual valve driving lever 70 is set at the L4-range, the terminals 608J and 608K are interconnected by the contact 608H. When the manual valve driving lever 70 is set at the H4-range, the terminals 608J and 608K are interconnected by the contact 608H, while the terminals 608L and 608M are interconnected by the contact 608I. When the manual valve driving lever 70 is set at the H2-range, tthe terminals 608J and 608K and the terminals 608L and 608M are disconnected, respectively. When both the lead wires 71A and 71C are live simultaneously, it is found that the transfer shift lever is set in the H4-range; when only the lead wire 71A is live, it is found that the transfer shift lever is set in the L4-range; and when both the lead wires 71A and 71C are dead, it is found that the transfer shift lever is set in the H2-range. The transfer manual valve 410 has an inlet port connected to the line 6 of the main hydraulic control unit 100 of the main transmission gear 10, an outlet port 413 connected to the line 7, an outlet port 414 connected to the line 8 and drain ports 415 and 416. When the transfer shift lever is operated to shift the manual valve driving lever 70 so that the spool 411 of the transfer manual valve 410 is moved to a position corresponding to the H2-range, the lines 6 and 7 are connected and the line 8 is connected to the drain port 416. When the spool 411 is moved to a position corresponding to the H4-range, the lines 7 and 8 are connected to the line 6. When the spool 411 is moved to a position corresponding to the L4-range, the line 8 is connected to the line 6, and the line 7 is connected to the drain port 415.

The relay valve 420 has a spool 421 having top and bottom lands 424 and 425 having the same diameter, a plunger 422 extended coaxially with the spool 421, and a spring 423 abutting on the top land 424. The plunger 422 has a top land 426 having the same diameter as that of the spool 421, and a bottom land 427 having a diameter greater than that of the lands of the spool 421. A top chamber 431, a first intermediate chamber 432, a second intermediate chamber 433 and a bottom chamber 435 are defined by the top land 424 of the spool 421, by the top land 424 and the bottom land 425 of the spool 421, by the bottom land 425 of the spool 421 and the top land 426 of the plunger 422, by the top land 426 and the bottom land 427 of the plunger 422, and by the bottom land 427 of the plunger, respectively.

When a fluid pressure is supplied through the line 6A to the bottom chamber 435 of the relay valve 420, the plunger 422 is moved to the upper position, and thereby the line 7 communicates with the line pressure supply line 7A by means of the first intermediate chamber 432 to enable to supply the line pressure to the bottom chamber 456 of the inhibitor valve 440 or to drain the bottom chamber 456 of the inhibitor valve 440 according to the position of the spool 411 of the transfer manual valve 410. When the line 7 is connected to the line pressure supply line 7A and the transfer manual valve 410 is set so as to supply the line pressure to the bottom chamber 456 of the inhibitor valve 440, the feedback pressure is supplied to the second chamber 456. Consequently, the spool 421 is fixed at the upper position and, when the electronic control unit 600 provides a signal to energize the solenoid valve S4 at this time to drain the bottom chamber 435, the plunger 422 is moved to the lower position, while the spool 421 remains fixed at the upper position, and thereby the line pressure is supplied continuously to the bottom chamber 456 of the inhibitor valve 440. In this state, when the transfer manual valve 410 is controlled to drain the line 7, or when the line 7 is connected to the line pressure supply line 7A, the bottom chamber 456 of the inhibitor valve 440 is drained and the electronic control unit 600 provides a signal to energize the fourth solenoid valve S4 to drain the bottom chamber 435, both the spool 421 and the plunger 422 are moved to the lower position by the spring 423 and the line 7A communicates with the drain port 436 by means of the first intermediate chamber 432. While the spool 421 is positioned at the lower position, the transfer manual valve 410 is unable to supply the line pressure to the bottom chamber 456 of the inhibitor valve 440 and the bottom chamber 456 of the inhibitor valve 440 remains drained. Consequently, the spool 441 of the inhibitor valve 440 is positioned at the lower position.

The inhibitor valve 440 has the spool 441 which is moved to a first position (lower position, as viewed in FIG. 4) or to a second position (upper position, as viewed in FIG. 4) to supply the line pressure to the hydraulic servomechanism C-3 of the clutch C3 and the hydraulic servomechanism B-4 of the brake B4 or to drain the hydraulic servomechanisms C-3 and B-4, and a plunger 442 which is disposed coaxially with the spool 441 and is moved to a first position (lower position, as viewed in FIG. 4) or to a second position (upper position, as viewed in FIG. 4). When the plunger 442 is moved to the second position (upper position), the pool 441 is moved to the second position. The spool 441 has a hollow top land 445, an intermediate land 446 and a bottom land 447 having the same diameter. A spring 450 abuts on the top land 445 to urge the spool 441 toward the first position. The plunger 442 has a top land 448 having the same diameter as that of the lands of the spool 441, and a bottom land 449 having a diameter greater than that of the top land 448. These lands of the spool 441 and the plunger 442 define, from the top to the bottom, a top chamber 451, a first intermediate chamber 452, a second intermediate chamber 453, a chamber 454 and a bottom chamber 456.

When the spool 441 of the inhibitor valve 440 is positioned at the lower position, the top chamber 451 communicates with the line 6A by means of a port 443 formed in the hollow top land 445, the first intermediate chamber 452 interconnects the line pressure supply line 6 and the deceleration line 6B, and the second intermediate chamber 453 interconnects the direct coupling line 6C and the drain port 457. When the spool 441 is positioned at the upper position, the top chamber communicates with the drain port 458 by means of the port 443 of the hollow top land 445, the first intermediate chamber 452 interconnects the deceleration line 6B and the drain port 459, and the second intermediate chamber 453 interconnects the line 6 and the direct coupling line 6C. The chamber 454 always communicates with the line 6A which supplies a fluid pressure controlled by the fourth solenoid valve S4 to urge the plunger 442 toward the first position (lower position) and the spool 441 toward the second position (upper position). The bottom chamber 456 is always pressurized to urge the plunger 442 toward the second position (upper position).

The orifice control valve 480 regulates the pressure of the fluid supplied thereto through the line 6B and supplies the fluid of a regulated pressure to the hydraulic servomechanism B-4 of the brake B4. The orifice control valve 480 has a spool 485 having a top land 482, an intermediate land 483 and a bottom land 484, a top chamber 486 defined by the top land 482, a first intermediate chamber 487 defined by the top land 482 and the intermediate land 483, a second intermediate chamber 488 defined by the intermediate land 483 and the bottom land 484, a bottom chamber 489 defined by the bottom land 484, a spring 481 accommodated in the bottom chamber 489, and an orifice 483A formed in the spool 485 to interconnect the first intermediate chamber 487 and the second intermediate chamber 488.

The top chamber 486 is connected to the line 1W of the main hydraulic control unit 100. The position of the spool 485 is dependent on the fluid pressure corresponding to the degree of opening of the throttle and the spring force of the spring 481. The line pressure supplied to the line 6B is supplied selectively through an orifice 6a or 6b provided in the line 6B to the hydraulic servomechanism B-4.

The fourth solenoid valve S4 is energized when the transfer shift lever, not shown, is shifted to the L4-range (low-speed four-wheel drive range) and the running condition of the vehicle meets predetermined conditions. The fourth solenoid valve S4 is de-energized when the transfer shift lever is shifted to the H2-range (two-wheel drive range) or the H4-range (high-speed four-wheel drive range) and the running condition of the vehicle meets predetermined conditions. The fourth solenoid valve S4 is thus controlled by the electronic control unit 600 according to the running condition of the vehicle. When the fourth solenoid valve S4 is not energized, a high-level solenoid pressure equal to the line pressure is produced in the line 6A communicating with the line 2 through an orifice 514 and, when the fourth solenoid valve S4 is energized, the line 6A is drained and a low-level solenoid pressure is produced.

The transfer shift lever of the transfer gear 50 is provided beside the driver's seat for operating the transfer manual valve 410. The transfer shift lever has auxiliary shift positions Sp for the H2-range (high-speed two-wheel drive range), the H4-range (high-speed four-wheel drive range) and the L4-range (low-speed four-wheel drive range). The positions Sp of the transfer shift lever and the resultant conditions of the brake B4 and the clutches C3 and C4 in relation to the running condition of the vehicle are shown in Table 3.

In Table 3, "α" indicates that once the solenoid valve S4 is de-energized, the high-speed running state is maintained even if the solenoid valve S4 is energized, and "β" indicates that once the solenoid valve S4 is energized, the low-speed running state is maintained if the solenoid valve S4 is de-energized. "E" indicates the engagement of the corresponding clutch or brake, and "X" indicates the disengagement of the corresponding clutch or brake.

The shift range of the transfer gear and the resultant connection of the line 7 and 8 to the line 6 are shown in Table 4.

In Table 4, "" indicates that the corresponding line is connected to the line 6 and the line pressure is supplied thereto, and "X" indicates that the corresponding line is drianed.

TABLE 3

| Sp | S4 | C3 | B4 | C4 | Running state |
|---|---|---|---|---|---|
| H2 | O | X | E | X | L2 |
|    | α | E | X | X | H2 |
| H4 | O | X | E | E | L4 |
|    | α | E | X | E | H4 |
| L4 | X | E | X | E | H4 |
|    | β | X | E | E | L4 |

TABLE 4

|        | H2 | H4 | L4 |
|--------|----|----|----|
| Line 7 | O  | O  | X  |
| Line 8 | X  | O  | O  |

The manner of operation of the transfer gear 50 for the shift ranges will be described hereinafter.

(A) Transfer shift lever position: H2-range.

As shown in Table 4, the line pressure is supplied to the line 7, while the line 8 is drained. Consequently, the hydraulic servomechanism C-4 is drained, and hence the clutch C4 is disengaged. Therefore, the power is not transmitted to the sleeve 53, and hence the two-wheel drive mode is provided.

While the electronic control unit 600 keeps the fourth solenoid S4 de-energized, the high-level solenoid pressure is supplied to the bottom chamber 435 of the relay valve 420, and thereby the spool 421 and the plunger 422 are moved to the upper position, the line 7 communicates with the line pressure supply line 7A by means of the relay valve 420, and the line pressure is supplied to the bottom chamber 456 of the inhibitor valve 440. Accordingly, the spool 441 and the plunger 442 of the inhibitor valve 440 are moved to the second position (upper position, as viewed in FIG. 4), the line 6B is drained through the drain port 459, and the hydraulic servomechanism B-4 is drained to disengage the brake B4. Since the spool 441 and the plunger 442 of the inhibitor valve 440 are moved to the second position (upper position), the line 6C is connected to the line 6 and communicates with the line 6D by means of the third accumulator control valve 460, so that the line pressure is supplied to the hydraulic servomechanism C-3 to engage the clutch C3. Consequently, the transfer gear 50 is in the H2 mode (high-speed two-wheel drive mode).

At this time, since a feedback pressure is supplied through the line pressure supply line 7A to the second intermediate chamber 433 of the relay valve 420, the spool 421 of the relay valve 420 is fixed at the upper position. Accordingly, if the fourth solenoid valve S4 is energized to supply the low-level solenoid pressure to the bottom chamber 435 of the relay valve 420, only the plunger 422 is moved to the lower position, whereas the spool 421 is held at the upper position, and hence the line pressure is supplied to the bottom chamber 456 of the inhibitor valve 440. Consequently, the transfer gear 50 is held in the H2 mode (high-speed two-wheel drive) even if the fourth solenoid valve S4 is energized.

(B) Transfer shift lever position: H4-range.

As shown in Table 4, the line pressure is supplied to both the lines 7 and 8.

Since the high-level solenoid pressure is supplied to the bottom chamber 435 of the relay valve 420 while the forth solenoid valve S4 is not energized under the control of the electronic control unit 600, the spool 421 and the plunger 422 are moved to the upper position, the line 7 is connected to the line pressure supply line 7A, and the line pressure is supplied to the bottom chamber 456 of the inhibitor valve 440. Therefore, the spool 441 and the plunger 442 of the inhibitor valve 440 are moved to the second position (upper position), the line 6B is drained through the drain port 459, and the hydraulic servomechanism B-4 is drained to disengage the brake B4. Since the spool 441 and the plunger 442 of the inhibitor valve 440 are held at the second position (upper position), the line 6C is connected to the line 6 and communicates with the line 6D by means of the third accumulator control valve 460, so that the line pressure is supplied to the hydraulic servomechanism C-3 to engage the clutch C3. The line pressure is supplied also to the hydraulic servomechanism C-4 through the line 8 to engage the clutch C4. Consequently, the transfer gear 50 is in the H4 mode (high-speed four-wheel drive mode).

In this state, since the feedback pressure is supplied through the line pressure supply line 7A to the second intermediate chamber 433 of the relay valve 420, the spool 421 of the relay valve 420 is fixed at the upper position. Therefore, if the fourth solenoid valve S4 is energized to supply the low-level solenoid pressure to the bottom chamber 435, only the plunger 422 is moved to the lower position, whereas the spool 421 is held at the upper position to supply the line pressure to the bottom chamber 456 of the inhibitor valve 440. Accordingly, the transfer gear 50 is held in the H4 mode (high-speed four-wheel drive mode).

(C) Transfer shift lever position: L4-range.

As shown in Table 4, the line 7 is drained and the line pressure is supplied to the line 8. Therefore, the lines 7 and 7A are drained regardless of the condition of the relay valve 420 and the clutch C4 is engaged by the line pressure supplied through the line 8. Accordingly, the transfer gear 50 is held in the four-wheel drive mode.

When the transfer shift lever is shifted from the H2-range or the H4-range to the L4-range and the fourth solenoid valve S4 is not energized under the control of the electronic control unit 600, the high-level solenoid pressure is supplied through the line 6A to the chamber 454 of the inhibitor valve 440 and the bottom chamber 456 is drained through the line 7A, the relay valve 420, the line 7 and the transfer manual valve 410. Consequently, the line pressure supplied to the chamber 454 moves the plunger 442 of the inhibitor valve 440 to the first position (lower position), whereas the spool 441 of the inhibitor valve 440 is held at the second position (upper position). Consequently, the transfer gear is held in the H4 mode (high-speed four-wheel drive mode).

When the electronic control unit 600 provides a signal to energize the fourth solenoid valve S4 while the transfer shift lever is in the L4-range or in the L4-range, the low-level solenoid pressure is supplied to the line 6A, and thereby the spool 441 of the inhibitor valve 440 is moved to the first position (lower position) by the spring 45. Consequently, the line 6 communicates with the line 6B by means of the inhibitor valve 440, and then the line pressure is supplied through the orifice 6a, and the orifice 6b or the orifice control valve 480 to the hydraulic servomechanism B-4 of the brake B4, the line 6C is drained through the first intermediate chamber 452 and the drain port 457 of the inhibitor valve 440, and thereby the hydraulic servomechanism C-3 of the clutch C3 is drained. Consequently, the mode of the transfer gear 50 is changed into the L4 mode (low-speed four-wheel drive mode). Once the L4 mode is provided, since the high-level solenoid pressure is supplied to the top chamber 451 through the port 443 of the hollow land 445 of the spool 441 at the moment when the high-level solenoid pressure is supplied to the line 6A, the spool 441 is held as it is even if the fourth solenoid valve S4 is de-energized. Thus, the transfer gear 50 is held in the L4 mode (low-speed four-wheel drive mode).

(D) Transfer shift lever shifting from the L4-range to the H2-range or H4-range.

While the fourth solenoid valve S4 is energized under the control of the electronic control unit 600, the bottom chamber 435 of the relay valve 420 is drained and the spool 421 and the plunger 423 are moved to the lower position by the spring 423, and hence the lines 7 and 7A are disconnected by the top land 424 and the bottom chamber 456 of the inhibitor valve 440 is drained. Accordingly, the spool 441 and the plunger 442 of the inhibitor valve 440 is moved to the lower position by the spring 450, the clutch C3 is disengaged and the brake B4 is engaged. Consequently, the transfer gear 50 is in the L2 mode (low-speed two-wheel drive mode) or the L4 mode (low-speed four-wheel drive mode). However, when the electronic control unit 600 provides a signal to de-energize the fourth solenoid valve S4, the high-level solenoid pressure is supplied to the bottom chamber 435 of the relay valve 420. Consequently, the spool 421 and the plunger 422 are moved to the upper position, the line 7 and the line pressure supply line 7A are connected, the line pressure is supplied to the bottom chamber 456 of the inhibitor valve 440, and the spool 441 and the plunger 442 of the inhibitor valve 440 are moved to the second position (upper position). Accordingly, the line 6B is drained through the drain port 459 to disengage the brake B4, and the spool 441 and the plunger 442 of the inhibitor valve 440 are moved to the second position (upper position), and thereby the line 6C is connected to the line 6, and hence the line pressure is supplied through the third accumulator control valve 460 and the line 6D to the hydraulic servomechanism C-3 to engage the clutch C3. Thus, the transfer gear 50 is shifted to the H2 mode (high-speed two-wheel drive mode) or to the H4 mode (high-speed four-wheel drive mode).

Figure 9:
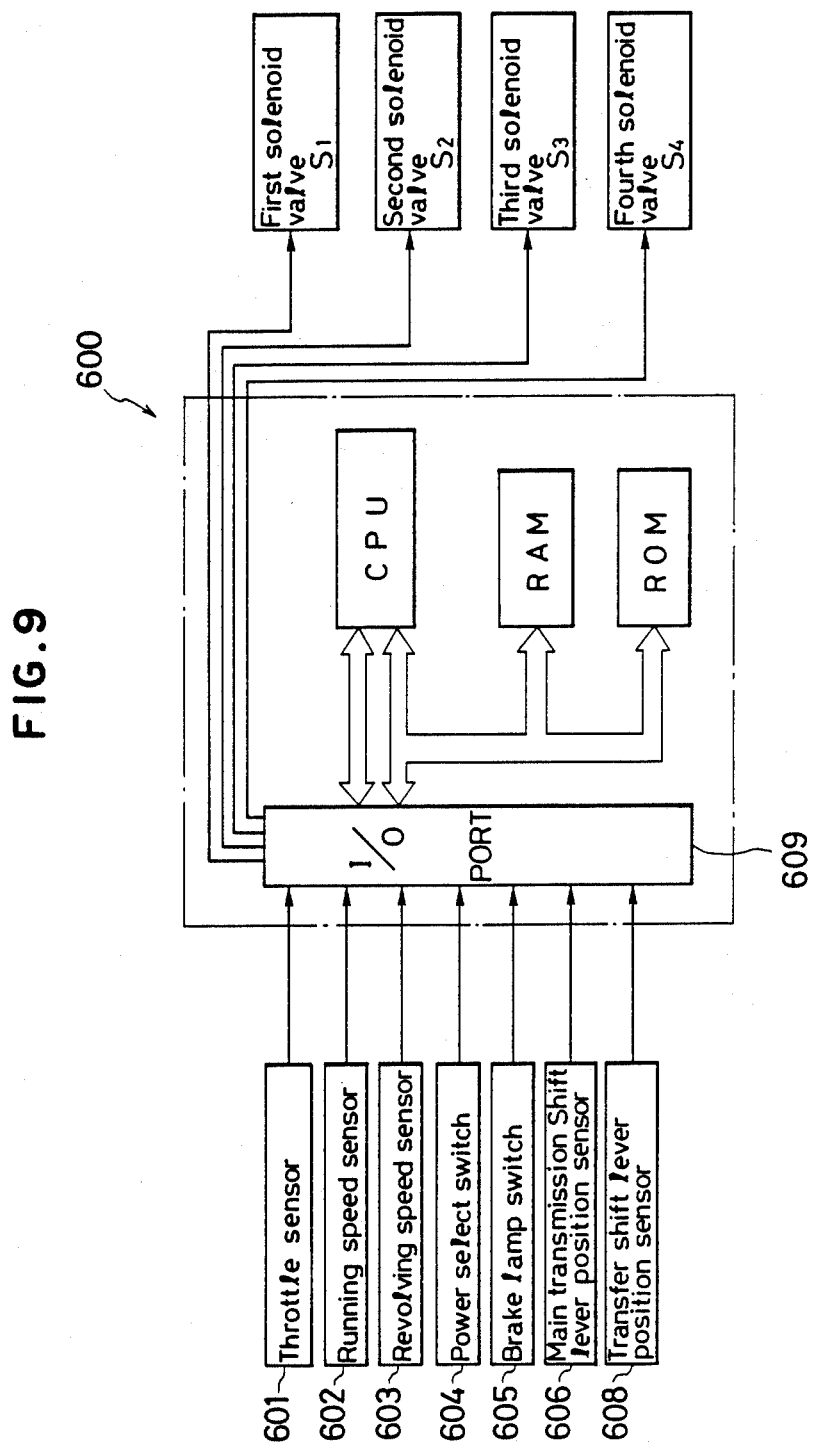
FIG. 9 is a block diagram of an electronic control unit.

FIG. 9 is a block diagram of the electronic unit 600 for controlling the solenoid valves S1 to S4 of the main hydraulic control unit 100 and the auxiliary hydraulic control unit 400.

The electronic control unit 600 comprises a throttle sensor 601 for detecting the degree of opening of the throttle valve, a running speed sensor 602 for detecting the revolving speed of the output shaft of the transfer gear 50 and for providing a running speed signal corresponding to the revolving speed of the output shaft of the transfer gear 50, a revolving speed sensor 603 for detecting the revolving speed of the output shaft 32 of the main transmission gear 10, namely, the input shaft of the transfer gear 50, a power select switch (PS) 604 for manually selecting a desired transmission pattern among an economy transmission pattern (E-pattern), a normal transmission pattern (N-pattern) and a power transmission pattern (P-pattern), a brake lamp switch 605, a main transmission shift lever position sensor 606 for detecting the present shift position Mp of the main transmission shift lever, a transfer shift lever position sensor 608 for detecting the present position Sp of the transfer shift lever of the transfer gear 50, and I/O port 609 for receiving signals from those sensors and giving signals to the solenoid valves S1 to S4, a central processing unit CPU, a random access memory RAM for deciding a speed change point, and a read-only memory ROM storing speed change pattern data such as speed change points and lockup points.

Figure 10B:
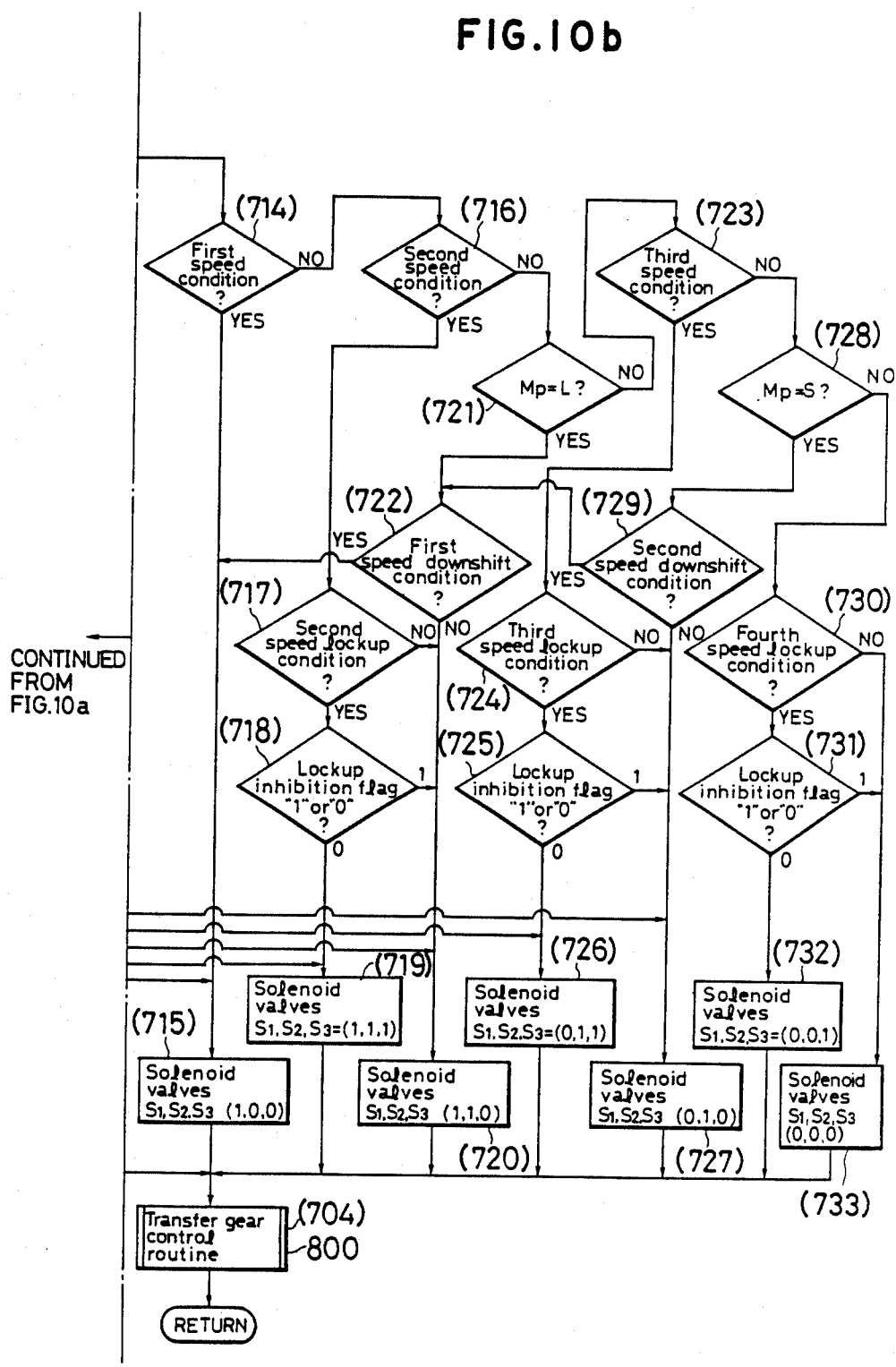
FIG. 10 is a flowchart showing the steps of speed change control procedure.

The manner of speed change control will be described with reference to a flow chart shown in FIG. 10.

The engine E is started by switching on the ignition switch, not shown, of the vehicle. The operating conditions of the vehicle is read (701) from the signals provided by the throttle sensor 601, the running speed sensor 602, the revolving speed sensor 603, the power select switch 604 (hereinafter referred to as "PS"), the brake lump switch 605, the main transmission shift lever position sensor 606 and the transfer shift lever position sensor 607. Decision is made as to whether or not the present shift position Mp of the main transmission gear 10 is the P-range (parking range) (702). When YES (Mp=P-range), an output signal to de-energize (indication: 0) the solenoid valves S1, S2 and S3 is provided (703), and then the operation advances to Step 704 and, when NO (Mp≠P-range), decision is made as to whether or not the shift position Mp is the R-range (reverse) (705). When YES (Mp=R-range), the operation advances to Step 703 and when NO (Mp≠R-range), decision is made as to whether or not the shift position Mp is the N-range (neutral) (706). When YES (Mp=N-range), the operation advances to Step 703 and, when NO (Mp≠N-range), decision is made as to whether or not the PS is set for the P-pattern (707). When YES (P-pattern), speed change operation is controlled according to the P-pattern in which high speed-change positions are provided (708), and then the operation goes to Step 704 and, when NO (not P-pattern), decision is made as to whether or not the PS is set for the E-pattern (709). When YES (E-pattern), speed change operation is controlled according to the E-pattern in which low speed-change points are provided (701), and then the operation goes to Step 704 and, when NO (not E-pattern, but N-pattern), decision is made as to whether or not the brake lamp switch 605 is ON (711). When YES (brake lamp switch is ON), normal brake lamp ON running is carried out (712), and then the operation goes to Step 704 and, when NO (brake lamp switch is OFF), in this embodiment, decision is made as to whether or not the fourth solenoid valve S4 is energized (713) to decide the condition of the transfer gear 50 (when the fourth solenoid valve S4 is energized -indication: "1"-, the transfer gear 50 is in the low-speed mode and, when not -indication: "0"-, the transfer gear 50 is in the high-speed mode). When the indication is "0" (the fourth solenoid valve S4 is not energized), decision is made as to whether or not the running condition of the vehicle corresponds to the first speed with the PS set for the N-pattern and the transfer gear 50 set in the high-speed mode (714). When YES (the first speed), an output signal is provided (715) to energize the solenoid valve S1 ("1") and to de-energize the solenoid valves S2 and S3, and then the operation goes to Step 704 and, when NO (a speed other than the first speed), decision is made as to whether or not the running condition of the vehicle corresponds to the second speed with the PS set for the N-pattern and the transfer gear 50 set in the high-speed mode (716). When YES (the second speed), decision is made as to whether or not the running condition of the vehicle corresponds to the second speed with the direct coupling clutch engaged at the lockup point of the transfer gear 50 for the high-speed mode and the PS set for the N-pattern (717). When YES (the second speed and the high-speed mode), decision is made if the lockup inhibition flag is "0" (not placed) or "1" (placed) (718). When "0" (not placed), an output signal is provided to energize the solenoid valves S1, S2 and S3 (719) and, when "1" (placed), an output signal is provided to energize the solenoid valves S1 and S2 and to de-energize the solenoid valve S3 (720), and then the operation goes to Step 704. When the decision at Step 717 is NO (a mode other than the second speed and high-speed mode), the operation goes to Step 720. When the decision at Step 716 is NO (a speed other than the second speed), decision is made as to whether or not the shift position Mp is L-range (721). When YES (Mp=L-range), decision is made as to whether or not shiftdown to the first speed is necessary (722). Whn YES (shiftdown to the first speed), the operation goes to Step 715 and, when the decision at Step 722 is NO (the first speed is not necessary), the operation goes to Step 720. When the decision at Step 721 is NO (Mp≠L-range), decision is made as to whether or not the running condition of the vehicle corresponds to the third speed with the PS set for the N-pattern and the transfer gear 50 set in the high-speed mode (723). When YES (the third speed), decision is made as to whether or not the running condition of the vehicle corresponds to the third speed of the high-speed mode at the lockup point with the PS set for the N-pattern and the transfer gear 50 set in the high-speed mode (724). When YES (the third speed of the high-speed mode), decision is made if the lockup inhibition flag is "0" or "1" (725). When "0" (the lockup inhibition flag is not placed), an output signal is provided to energize the solenoid valves S2 and S3 and to de-energize the solenoid valve S1 (726). When the decision at Step 725 is "1" (the lockup inhibition flag is placed), an output signal is provided to energize the solenoid valve S2 and to de-energize the solenoid valves S1 and S3 (727), and then the operation goes to Step 704. When the decision at Step 724 is NO (a speed other than the third speed of the high-speed mode), the operation goes to Step 727. When the decision at Step 723 is NO (a speed other than the third speed), decision is made as to whether or not the shift position MO is the S-range (second range) (728). When YES (Mp=S-range), decision is made as to whether or not shiftdown to the second speed is necessary (729). When YES (shiftdown to the second speed is necessary), the operation goes to Step 722 and, when NO (a condition other than that requiring shiftdown to the second speed), the operation goes to Step 727. When the decision at Step 728 is NO (Mp≠S-range), that is, the running condition of the vehicle corresponds to the fourth speed, decision is made as to whether or not the running condition of the vehicle corresponds to the fourth speed at the lockup point with the PS set for the N-pattern and the transfer gear set in the high-speed mode (730). When YES (fourth speed of the high-speed mode), decision is made if the lockup inhibition flag is "0" or "1" (731). When "0" (lockup inhibition flag is not placed), an output signal is provided to energize the solenoid valve S3 and to de-energize the solenoid valves S1 and S2 (732) and, when "1" (lockup inhibition flag is placed), an output signal is provided to de-energize the solenoid valves S1, S2 and S3 (733), and then the operation goes to Step 704. When the decision at Step 703 is NO (a condition other than that corresponding to the fourth speed of the high-speed mode), the operation goes to Step 734. When the decision at Step 713 is "1" (solenoid valve S4 is energized), decision is made as to whether or not the running condition of the vehicle corresponds to the first speed with the PS set for the N-pattern and the transfer gear 50 set in the low-speed mode (734). When YES (first speed), the operation goes to Step 715 and, when NO (a speed other than the first speed), decision is made as to whether or not the running condition of the vehicle corresponds to the second speed with the PS set for the N-pattern and the transfer gear 50 set in the low-speed mode (735). When YES (the second speed), decision is made as to whether or not the running condition of the vehicle corresponds to the second speed of the high-speed mode at the lockup point with the PS set for the N-pattern and the transfer gear 50 set in the low-speed mode (736). When "1" (the second speed of the high-speed mode), decision is made if the lockup inhibition flag is "0" or "1" (737). When "0" (lockup inhibition flag is not placed), the operation goes to Step 717 and, when "1" (lockup inhibition flag is placed), the operation goes to Step 720. When the decision at Step 736 is NO (a condition other than that corresponding to the second speed of the high-speed mode), the operation goes to step 720. When the decision at Step 735 is NO (a speed other than the second speed), decision is made if the shift position Mp is the L-range (738). When YES (Mp=L-range), decision is made as to whether or not the running condition requires shiftdown to the first speed (739). When YES (shiftdown to the first speed is necessary), the operation goes to Step 715 and, when NO (shiftdown to the first speed is not necessary), the operation goes to Step 720. When the decision at Step 738 is NO (Mp≠L-range), decision is made as to whether or not the shift position Mp is the S-range (740). When YES (Mp=S-range), decision is made if shiftdown to the second speed is necessary (741). When YES (shiftdown to the second speed is necessary), the operation goes to Step 739 and, when NO (shiftdown is not necessary), the operation goes to STep 727. When the decision at Step 740 is NO (Mp≠S-range), decision is made as to whether or not the running condition of the vehicle corresponds to the third speed of the high-speed mode at the lockup point with the PS set for N-pattern and the transfer gear 50 in the low-speed mode (742). When YES (the third speed of the high-speed mode), decision is made if the lockup inhibition flag is "0" or "1" (734). When "0" (the lockup inhibition flag is not placed), the operation goes to Step 726 and, when "1" (lockup inhibition flag is placed), the operation goes to Step 727. When the decision at Step 742 is NO (a condition other than that corresponding to the third speed in the high-speed mode), the operation goes to Step 727. Step 704 is a transfer gear control routine 800 for changing the transfer gear 50.

The control operation according to the transfer gear control routine 800 will be described with reference to flow charts shown in FIGS. 11 and 12.

Figure 11B:
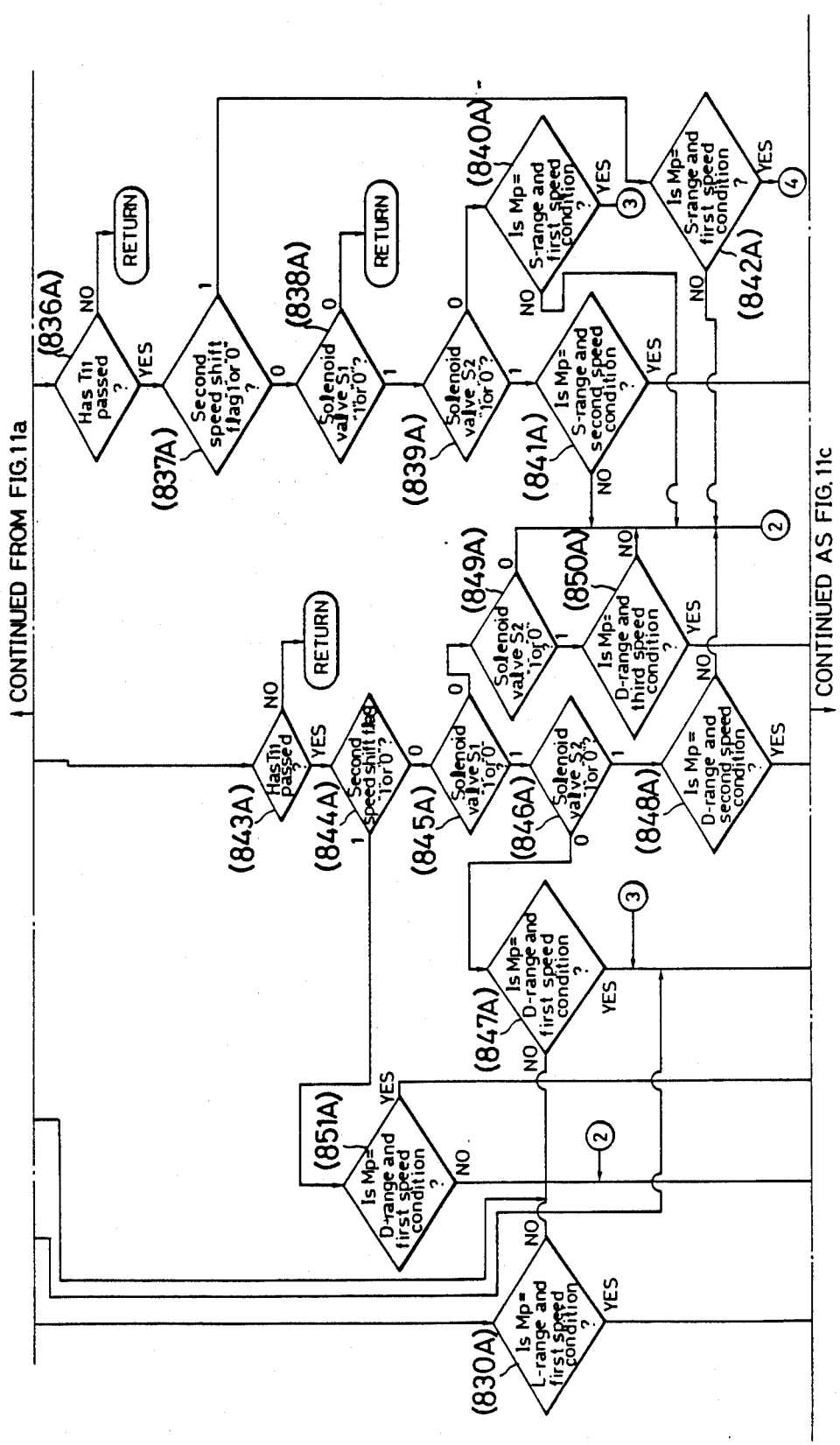
FIGS. 11 and 12 are flow charts showing the steps of the procedure for changing-over the transfer gear.
Figure 11C:
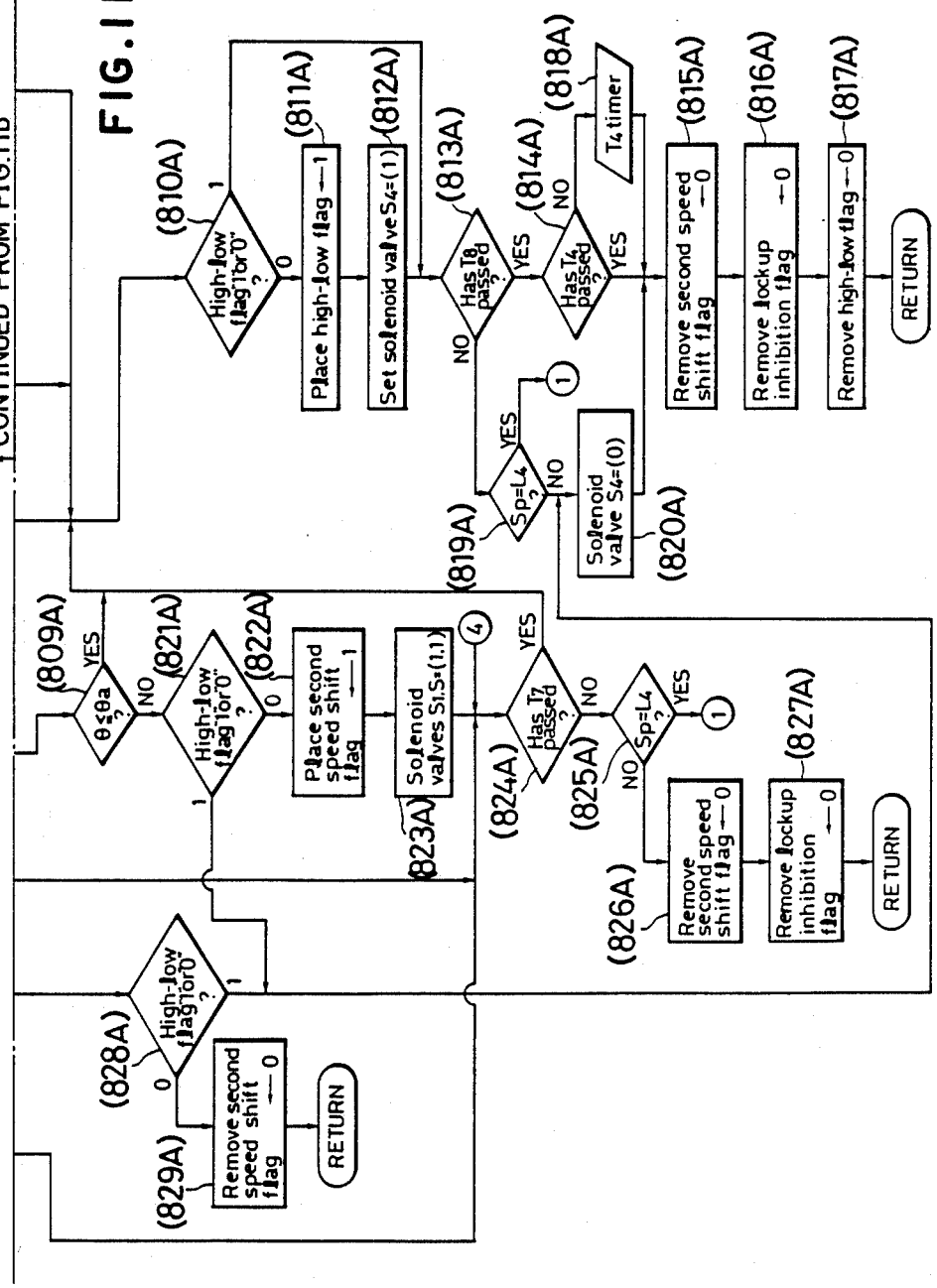

FIG. 11 is a flow chart of the speed change control operation according to the transfer gear control routine 800 for changing the mode of the transfer gear 50 from the high-speed mode to the low-speed mode.

At Step 801, decision is made as to whether the solenoid valve S4 is energized (indication: 1) or not energized (indication: 0). When "1" (the solenoid valve S4 is energized), decision is made that the transfer gear 50 is in the low-speed mode and the operation goes to a low-speed mode control routine 800B. When "0" (the solenoid valve S4 is not energized), decision is made that the transfer gear 50 is in the high-speed mode and the operation goes to a high-speed mode control routine 800A. Decision is made as to whether or not the shift position Sp of the transfer gear is L4-range, in which the lead wire 71A is live and the lead wire 71C is dead (802A). When NO (Sp≠L4-range), the operation is returned and, when YES (Sp=L4-range), decision is made that the transfer gear 50 is changed manually from the high-speed mode to low-speed mode, and then decision is made as to whether or not a set time T3 (a set time from the start to the completion of speed change of the main transfer gear 10) has passed (803A). When NO (the set time T3 has not yet passed), decision is made that the main transmission 10 is in the process of speed change, and then the operation is returned and, when YES (the set time T3 has passed), decision is made that the speed change of the main transmission gear 10 has been completed, and then decision is made as to whether or not the shift position Mp of the main transmission gear 10 is L-range (804A). When YES (Mp=L-range), decision is made as to whether or not a set time T11 (a set time from the start to the completion of the shift position Mp) has passed (805A). When NO (the set time T11 has not yet passed), the operation is returned and, when YES (the set time T11 has passed), decision is made if the shift flag of the second speed is "0" (not placed) or "1" (placed) (806A). When "0" (not placed), decision is made as to whether or not the speed of the main transmission gear 10 is the first speed, in which the solenoid valves S1 and S2 are "1" or "0", respectively (807A), and, when NO (the speed of the main transmission gear 10 is not the first speed), decision is made as to whether or not the running condition of the vehicle corresponds to a condition in which the shift position Mp is the L-range, the speed of the main transmission gear 10 is the first speed and the solenoid valve S4 may be energized (808A). When YES (the solenoid S4 may be energized), decision is made if the degree of opening θ of the throttle is below a set degree of opening θa (809A). When YES (θ<θa), decision is made as to whether a high-low shift flag is "0" (the flag is not placed) or "1" (the flag is placed) (801A). When "0" (not placed), the high-low flag is placed ("1") (811A). Then, an output signal is provided to energize the solenoid valve S4 (812A), and then decision is made whether or not a set time T8 (a time from the energization of the solenoid valve S4 to the start of movement of the spool 441 of the inhibitor valve 440) has passed (813A). When YES (the set time T8 has passed), decision is made as to whether or not a set time T4 (a time from the energization of the solenoid valve S4 to the completion of the speed change of the transfer gear 50 from the high-speed mode to the low-speed mode, namely, a speed change inhibition time for the main transmission gear 10) has passed (814A). When YES (the set time T4 has passed), a second shift flag is changed to "0" (815A), the lockup inhibition flag is changed to "0" (816A), the high-low shift flag is changed to "0", and then the operation is returned.

When the decision at Step 814A is NO (the set time T4 has not yet passed), the solenoid valves S1 and S2 of the main transmission gear 10 are held energized to inhibit the speed change of the main transmission gear 10 during the set time T4 (818A). When the decision at Step 813A is NO (the set time T8 has not yet passed), decision is made as to whether or not the shift position Sp of the transfer gear 50 is the L4-range (819A). When Yes (Sp=L4-range), the operation goes to Step 804A and, when NO (Sp≠L4-range), an output signal is provided to de-energize the solenoid valve S4 (820A), and then the operation goes to Step 815A. When the decision at Step 810A is "1" (the high-low flag is placed), the operation goes to Step 813A. When the decision at Step 809A is NO (θ>θa), decision is made if the high-low flag is "0" or "1" (821A). When "0" (the flag is not placed), the second speed shift flag is changed to "1" (822A), and then an output signal is provided to energize the solenoid valves S1 and S2 so that the main transmission gear 10 is upshifted to the second speed (823A). Then, the decision is made as to whether or not a set time T7 (a set time from the start of the upshift of the main transmission gear 10 upon the detection of the excess of the degree of opening θ of the throttle valve over the set degree of opening θa, namely, from the energization of the solenoid valves S1 and S2, to the completion of the upshift operation) has passed (824A). When YES (the set time T7 has passed) the operation goes to Step 810A, when NO (the set time T7 has not yet passed), decision is made as to whether or not the shift position Sp of the transfer gear 50 is the L4-range (825A). When YES (Sp=L4-range), the operation goes to Step 804A and, when NO (Sp≠L4-range), the shift flag of the second speed is changed to "0" (826A), the lockup inhibition flag is changed to "0", and then the operation is returned. When the decision at Step 821A is "1" (the high-low flag is placed), the operation goes to Step 820A. When the decision at Step 808A is NO (the energization of the solenoid valve S4 is inhibited), decision is made if the high-low shift flag is 37 0" or "1" (828A). When "0" (the high-low shift flag is not placed), the second speed shift flag is changed to "0" (829A), and then the operation is returned. When the decision at Step 828A is "1" (the second speed shift flag is placed), the operation goes to Step 820A. When the decision at Step 806A is "1" (the second speed flag is placed), decision is made as to whether or not the running condition of the vehicle corresponds to a condition in which the shift position Mp is the L-range, the speed of the main transmission gear 10 is the first speed and the solenoid valve S4 may be energized (830A). When YES (solenoid valve S4 may be energized) the operation goes to Step 824A and, when NO (the solenoid valve S4 may not be energized), the operation goes to Step 828A. When the decision at Step 804A is NO (Mp≠L-range), decision is made as to whether the solenoid valve S3 for locking up the main transmission gear 10 is energized ("1") or not energized ("0") (831A). When "1" (energized), the solenoid valve S3 is de-energized (832A) and, when "0" (not energized), the lockup inhibition flag is changed to "1" (833A). Then, decision is made whether or not a set time T6 (a set time from the de-energization of the solenoid valve S3 to the disengagement of the direct coupling clutch 16) has passed (834A). When NO (the set time T6 has not yet passed), the operation is returned and, when YES (the set time T6 has passed), decision is made as to whether or not the shift position Mp of the main transmission gear 10 is the S-range (835A). When YES (Mp=S-range), decision is made if a set time T11 has passed after the speed of the main transmission 10 has been changed (836A). When NO (the set time T11 has not yet passed), the operation is returned and, when YES (the set time T11 has passed), decision is made if the second speed flag is "0" or "1" (837A). When "0" (the second speed flag is not placed), decision is made as to whether the solenoid valve S1 is energized ("1") or not energized ("0") (838A). When "0" (not energized), decision is made that the main transmission gear 10 is in the third speed, and then the operation is returned. When the decision at Step 838A is "1" (energized), decision is made as to whether the solenoid valve S2 is energized ("1") or not energized ("0") (839A). When "0" (not energized), decision is made that the main transmission gear 10 is in the first speed, and then decision is made as to whether or not the running condition of the vehicle corresponds to a condition in which the shift position Mp is the S-range and the solenoid valve S4 may be energized (840A). When YES (the solenoid valve S4 may be energized), the operation goes to Step 809A and, when NO (the solenoid valve S4 may not be energized), the operation goes to Step 828A. When the decision at Step 839A is YES (the solenoid valve S2 is energized), decision is made that the main transmission gear 10 is in the second speed, and then decision is made as to whether or not the running condition of the vehicle corresponds to a condition in which the shift position Mp is the S-range, the main transmission gear 10 is in the second speed and the solenoid valve S4 may be energized (841A). When YES (the solenoid valve S4 may be energized), the operation goes to Step 810A and, when NO (the solenoid valve S4 may not be energized), the operation goes to Step 828A. When the decision at Step 837A is "1" (the second speed flag is placed), decision is made as to whether or not the running condition of the vehicle corresponds to a condition in which the shift position Mp is the S-range, the main transmission gear 10 is in the first speed and the solenoid valve S4 may be energized (842A). When YES (the solenoid valve S4 may be energized), the operation goes to Step 824A and, when NO (the solenoid valve S4 may not be energized), the operation goes to 828A. When the decision at Step 835A is NO (Mp≠S-range), decision is made as to whether or not the set time T11 has passed after the range of the main transmission gear 10 has been changed (843A). When NO (the set time T11 has not yet passed), the operation is returned and, when YES (the set time T11 has passed), decision is made as to whether the second speed flag is "0" or "1" (844A). When "0" (the second shift flag is not placed), decision is made as to whether the solenoid valve S1 is energized ("1") or not energized ("0") (845A). When "1" (energized), decision is made as to whether the solenoid valve S2 is energized ("1") or not energized ("0") (846A). When "0" (not energized), decision is made that the main transmission gear 10 is in the first speed, and then decision is made as to whether or not the running condition of the vehicle corresponds to a condition in which the shift position Mp is the D-range, the main transmission gear 10 is in the first speed and the solenoid valve S4 may be energized (847A). When YES (the solenoid valve S4 may be energized), the operation goes to Step 809A and, when NO (the solenoid valve S4 may not be energized), the operation goes to Step 828A. When the decision at Step 846A is "1" (the solenoid valve S2 is energized), decision is made that the main transmission gear 10 is in the second speed, and then decision is made as to whether or not the running condition of the vehicle corresponds to a condition in which the shift position Mp is the D-range, the main transmission gear 10 is in the second speed and the solenoid valve S4 may be energized (848A). When YES (the solenoid valve S4 may be energized), the operation goes to Step 810A and, when NO (the solenoid valve S4 may not be energized), the operation goes to Step 828A. When the decision at Step 845A is "0" (the solenoid valve S1 is not energized), decision is made as to whether the solenoid valve S2 is energized ("1") or not energized ("0") (849A). When "1" (the solenoid valve S2 is energized), decision is made that the main transmission gear 10 is in the third speed, and then decision is made as to whether or not the running condition of the vehicle corresponds to a condition in which the shift position Mp is the D-range, the main transmission gear 10 is in the third speed and the solenoid valve S4 may be energized (850A). When YES (the solenoid valve S4 may be energized), the operation goes to Step 810A and, when NO (the solenoid valve S4 may not be energized), the operation goes to Step 828A. When the decision at Step 849A is "0" (the solenoid valve S2 is not energized), decision is made that the main transmission gear 10 is in the fourth speed and the oepration goes to Step 828A. When the decision at Step 844A is "1" (the second speed flag is placed), decision is made whether the running condition of the vehicle corresponds to a condition in which the shift position Mp is the D-range, the main transmission gear 10 is in the first speed and the solenoid valve S4 may be energized (851A). When YES (the solenoid valve S4 may be energized) the operation goes to Step 824A and, when NO (the solenoid valve S4 may not be energized), the operation goes to Step 828A.

Figure 12A:
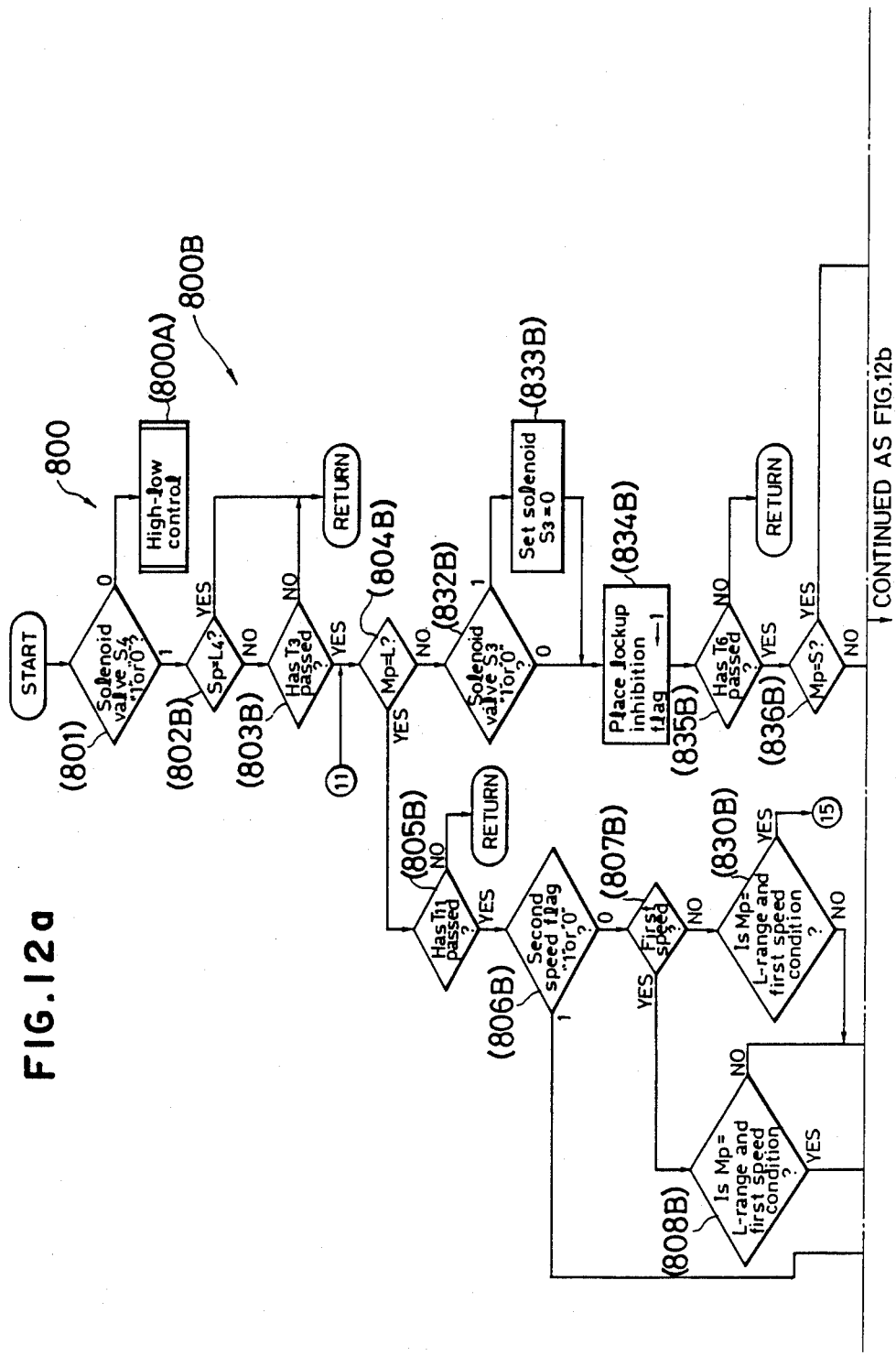

FIG. 12 shows a flow chart of a control process for changing the mode of the transfer gear 50 from the low-speed mode to the high-speed mode according to the transfer gear control routine 800.

At Step 801, decision is made as to whether the solenoid valve S4 is energized ("1") or not energized ("0"). When "0" (not energized), decision is made that the transfer gear 50 is in the high-speed mode, and the the operation goes to the high-speed mode control routine 800A. and, when "1" (the solenoid valve S4 is energized), decision is made that the transfer gear 50 is in the low-speed mode, and then the operation goes to the low-speed mode control routine 800B. Decision is made as to whether or not the shift position Sp of the transfer gear 50 is the L4-range (802B). When YES (Sp=L4-range), the operation is returned and, when NO (Sp≠L4-range), decision is made that the transfer gear 50 has been changed from the low-speed mode to the high-speed mode, and then decision is made as to whether or not a set time T3 (a set time from the start of the speed change of the main transmission gear 10 to the completion of the same) has passed after the start of the speed change of the main transmission gear 10 (803B). When NO (the set time T3 has not yet passed after the start of the speed change of the main transmission gear 10), decision is made that the main transmission 10 is in the speed change process, and then the operation is returned and, when YES (the set time T3 has passed after the start of the speed change of the main transmission gear 10), decision is made that the speed change of the main transmission gear 10 has been completed, and then decision is made as to whether or not the shift position Mp of the main transmission gear 10 is the L-range (804B). When YES (Mp=L-range), decision is made as to whether the set time T11 (a set time from the start to the completion of the Mp) has passed after the range change operation of the main transmission gear 10 (805B). When NO (the set time T11 has not yet passed), the operation is returned and, when YES (the set time T11 has passed), decision is made as to whether the second speed shift flag is "0" (not placed) or "1" (placed) (806B). When "0" (not placed), decision is made as to whether or not the main transmission gear 10 is in the first speed, in which the solenoid valve S1 is "1", while the solenoid valve S2 is "0" (807B). When YES (first speed), decision is made whether or not the running condition of the vehicle corresponds to a condition in which the shift position Mp is the L-range, the main transmission gear 10 is in the first speed and the solenoid valve S4 may not be energized (808B). When YES (the solenoid valve S4 may not be energized), decision is made as to whether or not the degree of opening θ of the throttle is below a set degree of opening θb (809B). When YES (θ<θb), decision is made as to whether the low-high shift flag is "0" (not placed) or "1" (placed) (810B). When "0" (not placed), the low-high shift flag is changed to "1" (811B). Then, an output signal is provided to de-energize the solenoid valve S4 (812B), and then decision is made as to whether or not the set time T8 (a set time from the de-energization of the solenoid valve S4 to the start of movement of the spool 441 of the inhibitor valve 440 has passed (813B). When YES (the set time T8 has passed), decision is made as to whether or not a set time T5 (a set time from the de-energization of the solenoid valve S4 to the completion of the change of the mode of the transfer gear 50 from the low-speed mode to the high-speed mode), namely, the speed change inhibition time for the main transmission gear 10, has passed (814B). When YES (the set time T5 has passed), the second speed shift flag is changed to "0" (815B), the lockup inhibition flag is changed to "0" (816B), the low-high shift flag is changed to "0" (817B), and then the operation is returned. When the decision at Step 814B is NO (the set time T5 has not yet passed), the solenoid valves S1 and S2 of the main transmission gear 10 are held energized to inhibit the speed change of the main transmission gear 10 (818B). When the decision at Step 813B is NO (the set time T9 has not yet passed), decision is made as to whether or not the shift position Sp of the transfer gear 50 is the L4-range (819B). When NO (Sp≠L4-range), the operation goes to Step 804B and, when YES (Sp=L4-range), an output signal is provided to energize the solenoid valve S4 (820B), and then the operation goes to Step 815B. When the decision at Step 810B is "1" (the low-high shift flag is placed), the operation goes to Step 813B. When the decision at Step 809B is NO (θ>θb), decision is made as to whether the low-high shift flag is "0" or "1" (821B). When "0" (the low-high shift flag is not placed), the second speed shift flag is changed to "1" (822B) and an output signal is provided to energize the solenoid valves S1 and S2 so that the main transmission gear 10 is upshifted from the first speed to the second speed (823B). Then decision is made as to whether or not a set time T10 (a set time from the start to the completion of the upshift of the main transmission gear 10, namely, a set time from the energization of the solenoid valves S1 and S2 to the completion of the upshift of the main transmission gear 10) has passed (824B). When YES (the set time T10 has passed), the operation goes to Step 810B and, when NO (the set time T10 has not yet passed), decision is made as to whether or not the shift position Sp of the transfer gear 50 is the L4-range (825B). When NO (Sp≠L4-range), the operation goes to Step 804B and, when YES (Sp=L4-range), the second speed shift flag is changed to "0" (826B), the lockup inhibition flag is changed to "0" (827B), and then the operation is returned. When the decision at Step 821B is "1" (low-high shift flag is placed), the operation goes to Step 820B. When the decision at Step 808B is NO (a condition other than that in which the solenoid valve S4 may not be energized), decision is made as to whether the low-high shift flag is "0" or "1" (828B). When "0" (not placed), the second speed shift flag is changed to "0" (829B), and operation is returned. When the decision at Step 828B is "1" (second speed shift flag is placed) the operation goes to Step 820B. When the decision at Step 807B is NO (the main transmission gear 10 is not in the first speed), decision is made that the main transmission 10 is in the second speed, and then decision is made as to whether or not the running condition of the vehicle corresponds to a condition in which the shift position Mp is the L-range and the solenoid valve S4 may not be energized (830B). When YES (the solenoid valve S4 may not be energized), the operation goes to Step 810B and, when NO (a condition other than that in which the solenoid valve S4 may not be energized, the operation goes to Step 828B. When the decision at Step 806B is "1" (the second speed shift flag is placed), decision is made as to whether or not the running condition of the vehicle corresposnds to a condition in which the shift position Mp is the L-range, the main transmission 10 is in the first speed and the solenoid valve S4 may not be energized (831B). When YES (the solenoid valve S4 may not be energized), the operation goes to Step 824B and, when NO (a condition other than that in which the solenoid valve S4 may not be energized), the operation goes to Step 828B. When the decision at Step 804B is NO (Mp≠L-range), decision is made as to whether the solenoid valve S3 for the lockup control of the main transmission gear 10 is energized ("1") or not energized ("0") (832B). When "1" (the solenoid valve S3 is energized), the solenoid valve S3 is de-energized (833B) and, when "0" (the solenoid valve S3 is not energized), the lockup inhibition flag is changed to "1" (834B). Then, decision is made as to whether or not the set time T6 (a set time from the de-energization of the solenoid valve S3 to the disengagement of the direct coupling clutch 16) has passed (835B). When NO (the set time T6 has not yet passed), the operation is returned and, when YES (the set time T6 has passed), decision is made as to whether the shift position Mp of the main transmission gear 10 is the S-range (836B). When YES (Mp=S-range), decision is made as to whether or not the set time T11 has passed after the range change operation of the main transmission gear 10 (837B).

When NO (the set time T11 has not yet passed), the operation is returned and, when YES (the set time T11 has passed), decision is made if the second speed shift flag is "0" or "1" (833B). When "0" (the second speed shift flag is not placed), decision is made as to whether the solenoid valve S1 is energized ("1") or not energized ("0") (839B). When "1" (the solenoid valve S1 is energized), decision is made if the solenoid valve S2 is energized ("1") or not energized ("0") (840B). When "0" (the solenoid valve S2 is not energized), decision is made that the main transmission gear 10 is in the first speed, and then decision is made as to whether or not the running condition of the vehicle corresponds to a condition in which the shift position Mp is the S-range, the main transmission gear 10 is in the first speed and the solenoid valve S4 may not be energized (841B). When YES (the solenoid valve S4 may not be energized), the operation goes to Step 809B and, when NO (a condition other than that in which the solenoid valve valve S4 may not be energized), the operation goes to Step 828B. When the decision at Step 840B is YES (the solenoid valve S2 is energized), decision is made that the main transmission gear 10 is in the second speed, and then decision is made as to whether or not the running condition of the vehicle corresponds to a condition in which the shift position Mp is the S-range, the main transmission gear 10 is in the second speed and the solenoid valve S4 may not be energized (842B). When YES (the solenoid valve S4 may not be energized), the operation goes to Step 810B and, when NO (a condition other than that in which the solenoid valve S4 may not be energized), the operation goes to Step 828B. When decision at Step 839B is "0" (the solenoid valve S1 is not energized), decision is made that the main transmission gear 10 is in the third speed, and then decision is made as to whether or not the running condition of the vehicle corresponds to a condition in which the shift position Mp is the S-range, the main transmission gear is in the third speed and the solenoid valve S4 may not be energized (843B). When YES (the solenoid valve S4 may not be energized), the operation goes to Step 810B and, when NO (a condition other than that in which the solenoid valve S4 may not be energized), the operation goes to Step 828B. When the decision at Step 837B is "1" (the second speed shift flag is placed), decision is made as to whether or not the running condition corresponds to a condition in which the shift position Mp is the S-range, the main transmission gear 10 is in the first speed and the solenoid valve S4 may not be energized (844B), and then the operation goes to Step 824B when the decision at Step 844 B is YES (the solenoid valve S4 may not be energized). When the decision at Step 844B is NO (a condition other than that in which the solenoid valve S4 may not be energized), the operation goes to Step 828B. When the decision at Step 836B is NO (Mp≠S-range), decision is made as to whether or not the set time T11 has passed after the main transmission gear 10 was operated for range change (845B). When NO (the set time T11 has not yet passed), the operation is returned and, when YES (the set time T11 has passed), decision is made as to whether the second speed shift flag is "0" or "1" (846B). When "0" (the second speed shift flag is not placed), decision is made as to whether the solenoid valve S1 is energized ("1") or not energized ("0") (847B). When "1" (the solenoid valve S1 is energized), decision is made as to whether the solenoid valve S2 is energized ("1") or not energized ("0") (848B). When "0" (the solenoid valve S2 is not energized), decision is made that the main transmission gear 10 is in the first speed, and then decision is made as to whether or not the running condition of the vehicle corresponds to a condition in which the shift position Mp is the D-range, the main transmission gear 10 is in the first speed and the solenoid valve S4 may not be energized (849B). When YES (the solenoid valve S4 may not be energized), the operation goes to Step 809B and, when NO (a condition other than that in whcih the solenoid valve S4 may not be energized), the operation goes to Step 828B. When the decision at Step 848B is "1" (the solenoid valve S1 is energized), decision is made that the main transmission gear 10 is in the second speed, and then decision is made as to whether or not the running condition of the vehicle corresponds to a condition in which the shift position Mp is the D-range, the main transmission gear 10 is in the second speed and the solenoid valve S4 may not be energized (850B). When YES (the solenoid valve S4 may not be energized) the operation goes to Step 810B and, when NO (a condition other than that in which the solenoid valve S4 may not be energized), the operation goes to Step 828B. When the decision at Step 847B is "0" (the solenoid valve S1 is not energized), decision is made as to whether the solenoid valve S2 is energized ("1") or not energized ("0") (851B). When "1" (the solenoid valve S2 is energized), decision is made that the main transmission gear 10 is in the third speed, and then decision is made as to whether or not the running condition of the vehicle corresponds to a condition in which the shift position Mp is the D-range, the main transmission gear 10 is in the third speed and the solenoid valve S4 may not be energized (852B). When YES (the solenoid valve S4 may not be energized) the operation goes to Step 810B and, when NO (a condition other than that in which the solenoid valve S4 may not be energized), the operation goes to Step 828B. When the decision at Step 851B is "0" (the solenoid valve S2 is not energized), decision is made that the main transmission gear 10 is in the fourth speed, and then the operation goes to Step 828B. When the decision at Step 846B is "1" (the second speed shift flag is placed), decision is made as to whether or not the running condition of the vehicle corresponds to a condition in which the shift position Mp is the D-range, the main transmission gear 10 is in the first speed and the solenoid valve S4 may not be energized (853B). When YES (the solenoid valve S4 may not be energized), the operation goes to Step 824B and, when NO (a condition other than that in which the solenoid valve S4 may not be energized), the operation goes to Step 828B.

In this embodiment, the condition of the transfer gear 50 is detected through the detection of the position of the transfer shift lever for manually controlling the manual valve, however, it is also possible to detect the condition of the transfer gear 50 by incorporating control means, such as a solenoid valve, for electrically controlling the fluid pressure into the manual valve and operating means, such as a switch, for changing over the electrically controlled control means.

In this embodiment, the main transmission gear is an automatic transmission employing planetary gearings, however, the main transmission may be a transmission such as a continuously variable speed transmission or a transmission having a plurality of gear trains.

The transfer gear employing in the embodiment described herein has a change mechanism for changing between a two-wheel drive mode and a four-wheel drive mode and a speed change mechanism, however, a transfer mechanism having only either a two-wheel drive mechanism or a four-wheel drive mechanism may be employed.

The transfer gear employed in the embodiment described herein employs a planetary gearing as a speed change mechanism and has a two-speed transmission mechanism capable of high-speed mode (direct drive mode) and a low-speed mode (reduction drive mode), however, a transmission having a plurality of gear trains or a continuously variable speed transmission may be employed.

Although the invention has been described in its preferred form with a certain degree of particularity, it is to be understood that many changes and variations are possible in the invention without departing the scope and spirit thereof.

What is claimed is:

1. A control system for a vehicle transmission, comprising
   a main transmission;
   a transfer gear having at least two speed modes being operative in respective shifting conditions of said transfer gear;
   means forming part of said transfer gear for changing from a two-wheel drive mode to a four-wheel drive mode and conversely;
   a manual shifting valve operatively connected with said transfer gear for changing said speed modes and drive modes;
   an electric detecting means for detecting the shifting condition of said transfer gear for a respective said speed mold; and
   an electric control means for controlling said main transmission according to said detected speed mode of said transfer gear.

2. A control system as defined in claim 1, wherein said electric detecting means is interlocked with said manual shifting valve.

3. A control system as defined in claim 1, wherein said manual shifting valve has at least two outlet ports, and said transfer gear has a high-speed four-wheel drive mode, a low-speed four-wheel drive mode and a high-speed two-wheel drive mode.

4. A control system as defined in claim 3, wherein said electric detecting means is interlocked with said manual shifting valve.

5. A control system for a vehicle transmission, comprising
   a main transmission;
   a transfer gear having a high-speed four-wheel drive mode, a low-speed four-wheel drive mode and a high-speed two-wheel drive mode being operative in respective shifting conditions of said transfer gear;
   a manual shifting valve operatively connected with said transfer gear and having at least two outlet ports;
   means forming part of said transfer gear for changing from a two-wheel drive mode to a four-wheel drive mode and conversely; and
   an electric detecting means for detecting the shifting condition of said transfer gear.

6. A control system as defined in claim 5, wherein said electric detecting means is interlocked with said manual shifting valve.

* * * * *